United States Patent
Hanatani et al.

(10) Patent No.: US 10,447,469 B2
(45) Date of Patent: Oct. 15, 2019

(54) MANAGEMENT APPARATUS, COMPUTER PROGRAM PRODUCT, SYSTEM, DEVICE, AND METHOD

(71) Applicant: Kabushiki Kaisha Toshiba, Minato-ku (JP)

(72) Inventors: Yoshikazu Hanatani, Komae (JP); Yoshihiro Oba, Kawasaki (JP); Tatsuyuki Matsushita, Nerima (JP); Naoki Ogura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 249 days.

(21) Appl. No.: 15/448,159

(22) Filed: Mar. 2, 2017

(65) Prior Publication Data
US 2017/0180120 A1    Jun. 22, 2017

Related U.S. Application Data

(63) Continuation of application No. PCT/JP2015/057749, filed on Mar. 16, 2015.

(51) Int. Cl.
*H04L 29/06* (2006.01)
*H04L 9/08* (2006.01)

(52) U.S. Cl.
CPC .......... *H04L 9/0819* (2013.01); *H04L 9/0836* (2013.01); *H04L 63/065* (2013.01)

(58) Field of Classification Search
CPC .... H04L 9/0819; H04L 63/065; H04L 9/0836
See application file for complete search history.

(56) References Cited

U.S. PATENT DOCUMENTS

| 6,049,878 A | 4/2000 | Caronni et al. |
| 7,599,497 B2 * | 10/2009 | Soppera ............... H04L 9/0836 380/279 |

(Continued)

FOREIGN PATENT DOCUMENTS

| JP | 2003-204321 | 7/2003 |
| JP | 2005-198116 | 7/2005 |

(Continued)

OTHER PUBLICATIONS

Changkyu et al., "FAST: fast architecture sensitive tree search on modern CPUs and GPUs", SIGMOD '10 Proceedings of the 2010 ACM SIGMOD International Conference on Management of data, Indianapolis, Indiana, USA—Jun. 6-10, 2010.*

(Continued)

*Primary Examiner* — Morshed Mehedi
(74) *Attorney, Agent, or Firm* — Oblon, McClelland, Maier & Neustadt, L.L.P.

(57) ABSTRACT

According to an embodiment, a management apparatus connectable to a plurality of devices through a network includes storage, one or more processors, and an assignment transmitter. The storage stores therein management tree information in which node keys are respectively assigned to nodes and devices are respectively assigned to leaf nodes. The processors calculate similarity between attribute information representing an attribute of a new device and attribute information of devices already assigned in the management tree information. The processors determine a first leaf node to which the new device is to be assigned in the management tree information, based on the similarity. The assignment transmitter transmits, to the new device, at least one node key of node keys assigned to nodes on a path from a root node to the first leaf node in the management tree information.

16 Claims, 16 Drawing Sheets

(56) References Cited

U.S. PATENT DOCUMENTS

| | | |
|---|---|---|
| 2002/0147906 A1 | 10/2002 | Lotspiech et al. |
| 2003/0081786 A1* | 5/2003 | Nakano ............ G11B 20/00086 |
| | | 380/277 |
| 2003/0185399 A1 | 10/2003 | Ishiguro |
| 2007/0180233 A1* | 8/2007 | Matsushita ........... H04L 9/0833 |
| | | 713/159 |
| 2008/0152133 A1* | 6/2008 | Suga ..................... H04L 9/0836 |
| | | 380/45 |
| 2012/0243685 A1* | 9/2012 | Tanaka .................. H04L 63/062 |
| | | 380/270 |

FOREIGN PATENT DOCUMENTS

| | | |
|---|---|---|
| JP | 2012-204897 | 10/2012 |
| WO | WO 02/060116 A2 | 8/2002 |
| WO | WO 02/080448 A1 | 10/2002 |
| WO | WO 2014/010087 A1 | 1/2014 |

OTHER PUBLICATIONS

International Search Report dated Jun. 16, 2015 in PCT/JP2015/057749 filed on Mar. 16, 2015 (with English translation).
Written Opinion dated Jun. 16, 2015 in PCT/JP2015/057749 filed on Mar. 16, 2015.
"IEEE Standard for Local and metropolitan area networks", IEEE 802.21 d, Media Independent Handover Services, 2015, 106 pgs.

* cited by examiner

FIG.8

| IDENTIFICATION INFORMATION | FIXED | | | | | TIME-DEPENDENT CHANGE | | | |
|---|---|---|---|---|---|---|---|---|---|
| | VENDOR NAME | TYPE | MEMORY CAPACITY | MAXIMUM POWER CONSUMPTION | ... | AVERAGE POWER CONSUMPTION | MOST FREQUENT COMMAND NAME | COMMAND FREQUENCY | ... |
| x | ABC | AIR CONDITIONER | 777 [kB] | 1200 [W] | ... | 700 [W] | POWER CONTROL | 30 TIMES/ DAY | ... |

MANAGEMENT APPARATUS, COMPUTER PROGRAM PRODUCT, SYSTEM, DEVICE, AND METHOD

CROSS-REFERENCE TO RELATED APPLICATIONS

This application is a continuation of PCT international application Ser. No. PCT/JP2015/057749 filed on Mar. 16, 2015 which designates the United States; the entire contents of which are incorporated herein by reference.

FIELD

Embodiments described herein relate generally to a management apparatus, a computer program product, a system, a device, and a method.

BACKGROUND

A key held in common by some of a plurality of devices is called a group key. Such a group key is used to encrypt data, so that data can be transmitted to devices belonging to the group and can be concealed from devices not belonging to the group. A key distributed to each device for distributing the group key to each device is called a device key.

A method is known which manages a device key using management tree information that is data representing a graph with tree structure. In this method, a node key is assigned to each node in the management tree information, and a device is assigned to a leaf node. In this method, all of the node keys assigned to the nodes on the path from the root node to the corresponding leaf node are distributed to each device. In this method, the device stores a set of all of the distributed node keys as a device key. A group key is encrypted by one or more node keys included in the device key when distributed.

When a new device is connected to a system, a management apparatus that manages management tree information has to distribute a node key and a group key to the new device. In this case, in order to efficiently transmit information to a plurality of devices belonging to the same group, the management apparatus has to assign the new device in the management tree information.

BRIEF DESCRIPTION OF THE DRAWINGS

FIG. 8 is a diagram illustrating elements included in attribute information.

DETAILED DESCRIPTION

According to an embodiment, a management apparatus connectable to a plurality of devices through a network includes storage, one or more processors, and an assignment transmitter. The tree storage stores therein management tree information in which node keys are respectively assigned to nodes and devices are respectively assigned to leaf nodes. The processors calculate similarity between attribute information representing an attribute of a new device and attribute information of devices already assigned in the management tree information. The processors determine a first leaf node to which the new device is to be assigned in the management tree information, based on the similarity. The assignment transmitter transmits, to the new device, at least one node key of node keys assigned to nodes on a path from a root node to the first leaf node in the management tree information.

A communication system according to an embodiment will be described in detail below with reference to the drawings. The transmission system according to the present embodiment is able to assign devices to nodes in management tree information so as to efficiently transmit information such as group keys to a plurality of devices.

In the present embodiment, a cryptographic key for encrypting data is used. A symmetric key encryption scheme such as AES may be used or an asymmetric key encryption scheme (public key cryptosystem) may be used for the algorithm for encrypting and decrypting data with a cryptographic key.

Figure 1:
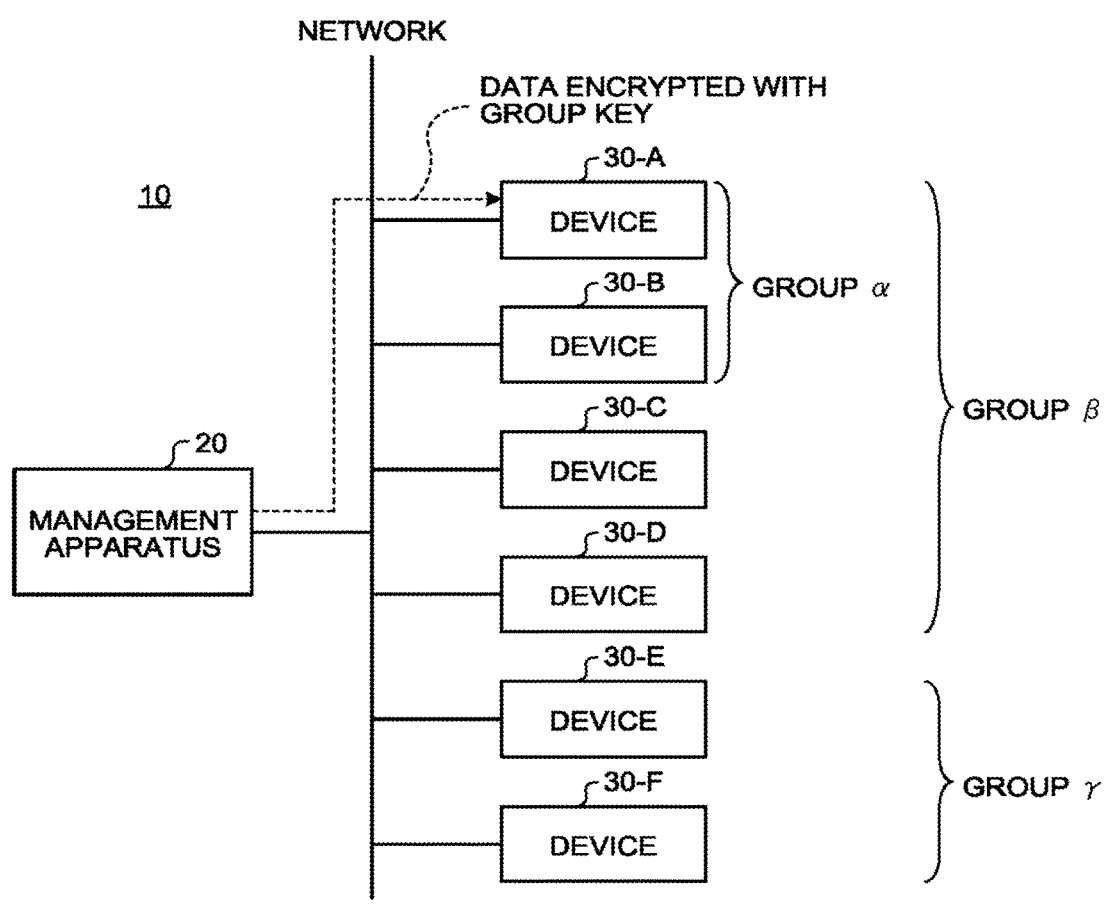
FIG. 1 is a configuration diagram of a communication system according to an embodiment.

FIG. 1 is a diagram illustrating a configuration of the communication system 10 according to the embodiment. The communication system 10 includes a management apparatus 20 and a plurality of devices 30 (30-A to 30-F).

The management apparatus 20 and the devices 30 can be connected to each other through a network. The network is, for example, a LAN formed at home. Other examples of the network include public networks, such as the Internet, and VPN (Virtual Private Network). A variety of schemes such as IEEE 002.11-compliant wireless LANs, Ethernet (registered trademark), and IEEE 1394 can be applied as the physical layer and the link layer of the network.

The management apparatus 20 is an information processing apparatus such as a computer. The management apparatus 20 executes a predetermined computer program on an operating system and, for example, is always activated.

The devices 30 are apparatuses having the communication function and the information processing function. For example, the devices 30 may be home appliances (for example, air conditions, television sets, and refrigerators connectable to a network). The devices 30 may be portable information devices such as smartphones, tablet computers, and notebook computers.

In the communication system 10, data is transmitted between the management apparatus 20 and a device 30 or between a device 30 and device 30. Examples of the data transmitted include control commands for controlling the operation of devices 30, the values of keys used by the management apparatus 20 or devices 30 for encryption or authentication, identifier information of keys, and identification information (for example, MAC address or IP address) of the management apparatus 20 or devices 30. Other examples of the data transmitted include moving image data, voice data, text data, and computer program codes.

Such data is encrypted by a group key. The group key is a key held in common by the devices 30 belonging to a group.

The management apparatus 20 sets a group for a plurality of devices 30 connected to a network, for example, in accordance with an instruction by the user or a preset rule. The management apparatus 20 may set a plurality of groups. The management apparatus 20 may place one device 30 under a plurality of groups. There may be a device 30 that does not belong to any group. The management apparatus 20 assigns a unique group key to each group. The management apparatus 20 encrypts data with a group key and transmits the encrypted data to a network to allow a device 30 belonging to the group to acquire the data and conceal the data from a device 30 not belonging to the group.

The management apparatus 20 encrypts the group key with a node key assigned to each device 30 and provides the device 30 with the encrypted group key. The node key is a key shared between the management apparatus 20 and a device 30. One device 30 holds a set of at least one node key as a device key. The management apparatus 20 manages node keys held by the respective devices 30 using management tree information representing a tree structure (undirected graph having no loop). Alternatively, the management apparatus 20 may transmit data encrypted with a node key to a device 30.

Figure 2:
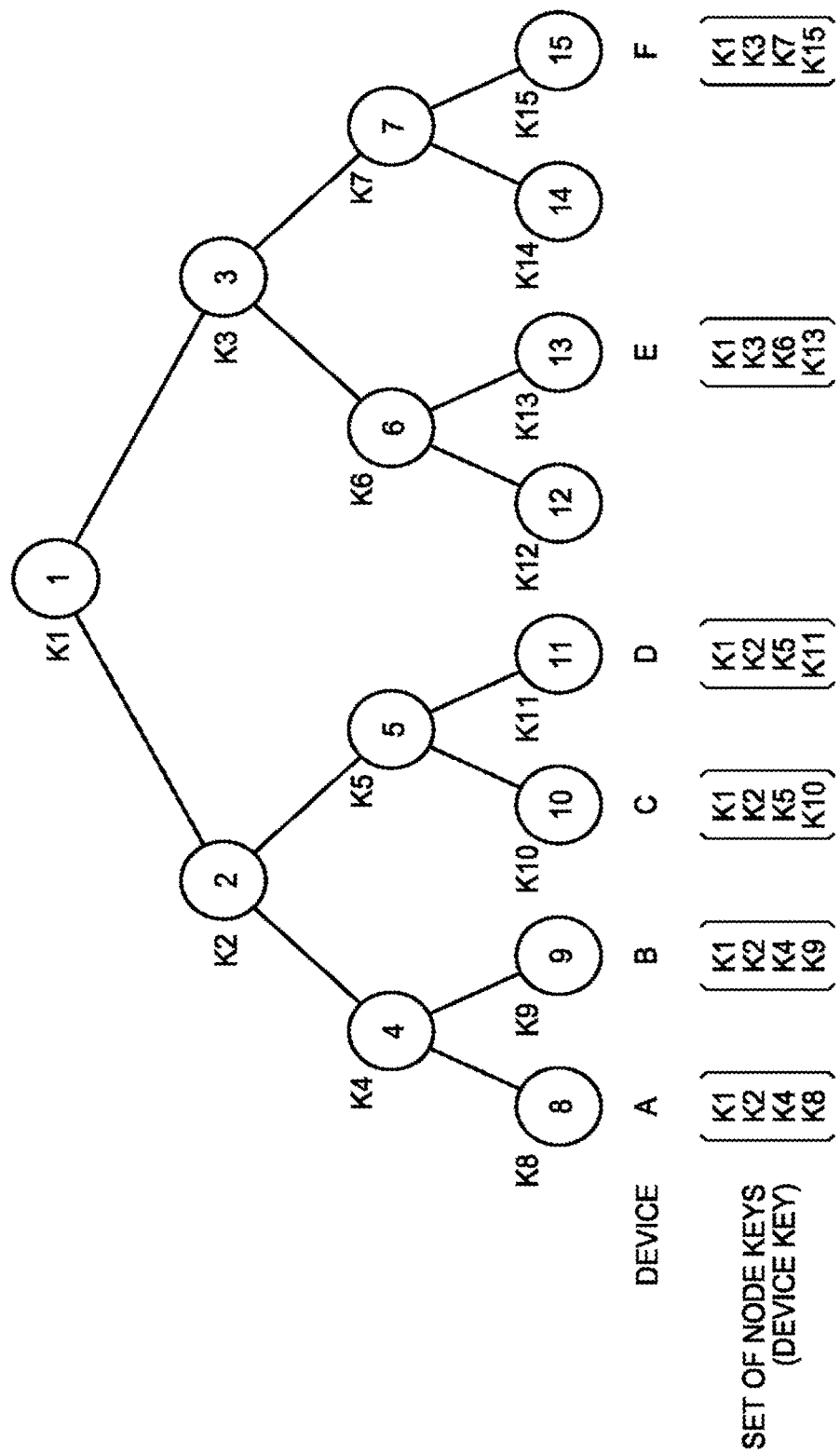
FIG. 2 is a diagram illustrating an example of management tree information.

FIG. 2 is a diagram illustrating an example of the management tree information. The management tree information includes a plurality of nodes (depicted by circles in FIG. 2) and a plurality of edges connecting nodes. One node on the top (highest level) of the tree structure is called a root node. Each node arranged at the end (lowest level) of the tree structure is called a leaf node.

A unique node number is allocated to each node. In the example in FIG. 2, the number in a circle indicates a node number.

The management apparatus 20 assigns a node key to each node. The node key varies among nodes. In the example in FIG. 2, the management apparatus 20 assigns node keys K1 to K15 to nodes having node numbers 1 to 15, respectively.

The management apparatus 20 also assigns each device 30 to any one of leaf nodes. The management apparatus 20 assigns one device 30 to one leaf node and does not redundantly assign a plurality of devices 30 to one leaf node. The management tree information may include an empty leaf node to which no device 30 is assigned. In the example in FIG. 2, the management apparatus 20 assigns the devices 30 with identification information A, F, C, D, E, F to the nodes with node numbers 8, 9, 10, 11, 13, 15, respectively.

The management apparatus 20 transmits, to each device 30, at least one node key of node keys assigned to nodes on the path from the root node in the management tree information to the corresponding leaf node to which the device 30 is assigned (for example, all node keys assigned to nodes on the path from the root node to the corresponding leaf node). The device 30 stores a set of at least one node key transmitted from the management apparatus 20, as a device key. For example, the management apparatus 20 transmits node keys K1, K2, K4, and K8 to the device 30 with identification information A assigned to node number 8. The management apparatus 20 transmits at least the node key assigned to a leaf node and does not necessarily transmit all of the node keys assigned to nodes on the path from the root node to the corresponding leaf node.

The management tree information is not limited to a binary tree and may be a ternary tree or an N-ary tree. The management tree information may be a non-perfect tree structure and may be of various structures.

Figure 3:
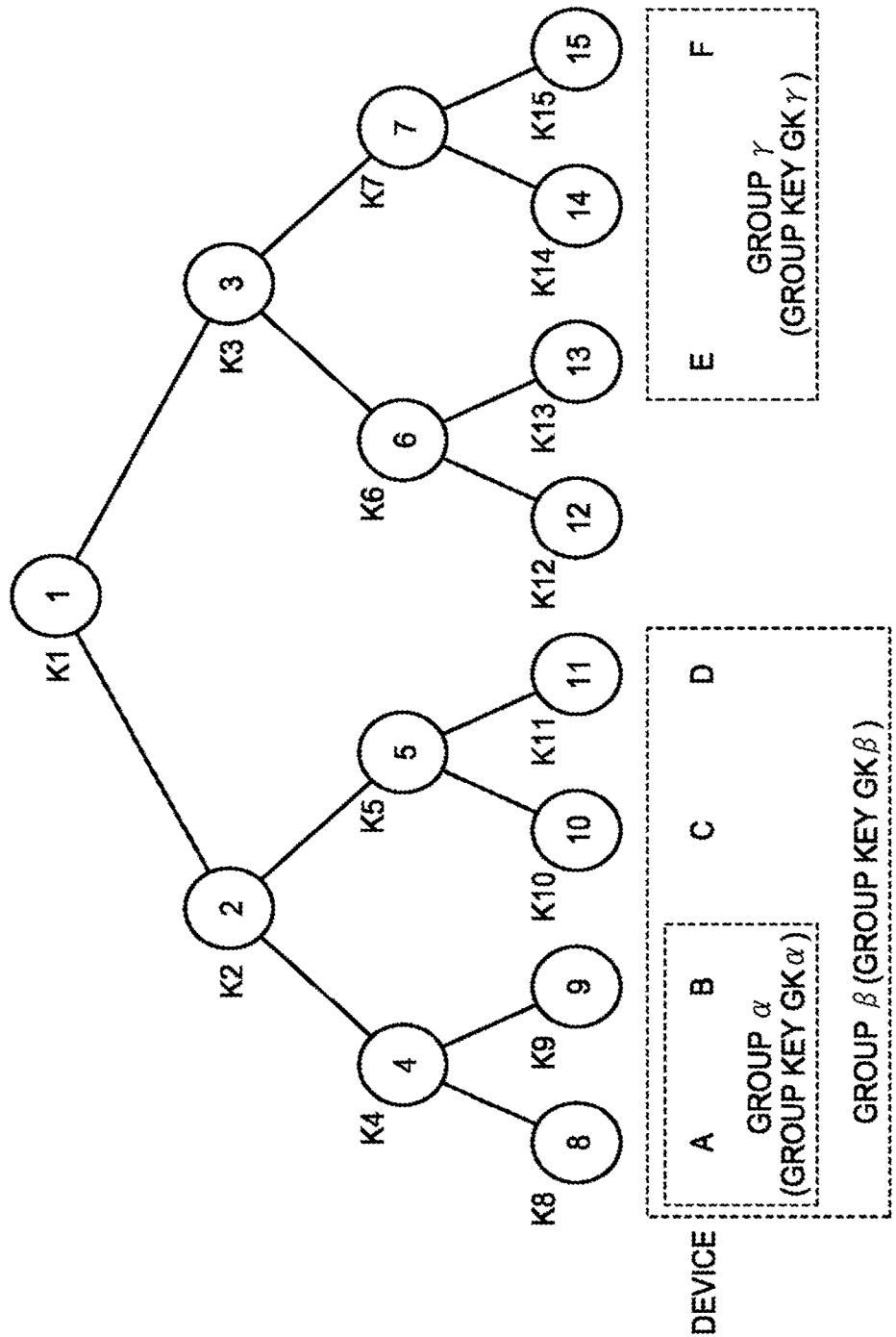
FIG. 3 is a diagram illustrating an example of groups.

FIG. 3 is a diagram illustrating an example of groups. The management apparatus 20 generates a unique group key for each group. The management apparatus 20 transmits at least one cyphertext generated by encrypting one group key with at least one node key to each device 30 belonging to a group. Specifically, the management apparatus 20 selects at least one node key such that all of the devices 30 belonging to a group can decrypt any one of cyphertexts and that the number of transmitted cyphertexts is minimized. The management apparatus 20 then generates a cyphertext with each of the selected node keys and transmits the generated cyphertext.

In the example in FIG. 3, the devices 30 with identification information A, B form a group $\alpha$. The node key K4 is held in common by the devices 30 with identification information A, B but is not held by other devices 30. The management apparatus 20 then encrypts the group key GK$\alpha$ of the group $\alpha$ with the node key K4. The management apparatus 20 thus can efficiently transmit the group key GPO to the two devices 30 forming the group $\alpha$.

In the example in FIG. 3, the devices 30 with identification information A, B, C, D form a group $\beta$. The node key K2 is held in common by the devices 30 with identification information A, B, C, D but is not held by other devices 30. The management apparatus 20 then encrypts the group key GK$\beta$ of the group with the node key K2. The management apparatus 20 thus can efficiently transmit the group key GK$\beta$ to the four devices 30 forming the group $\beta$.

In the example in FIG. 3, the devices 30 with identification information E, F form a group $\gamma$. The node key K3 is held in common by the devices 30 with identification information E, F but is not held by other devices 30. The management apparatus 20 then encrypts the group key GK$\gamma$ of the group $\gamma$ with the node key K3. The management apparatus 20 thus can efficiently transmit the group key GK$\gamma$ to the two devices 30 forming the group $\gamma$.

Figure 4:
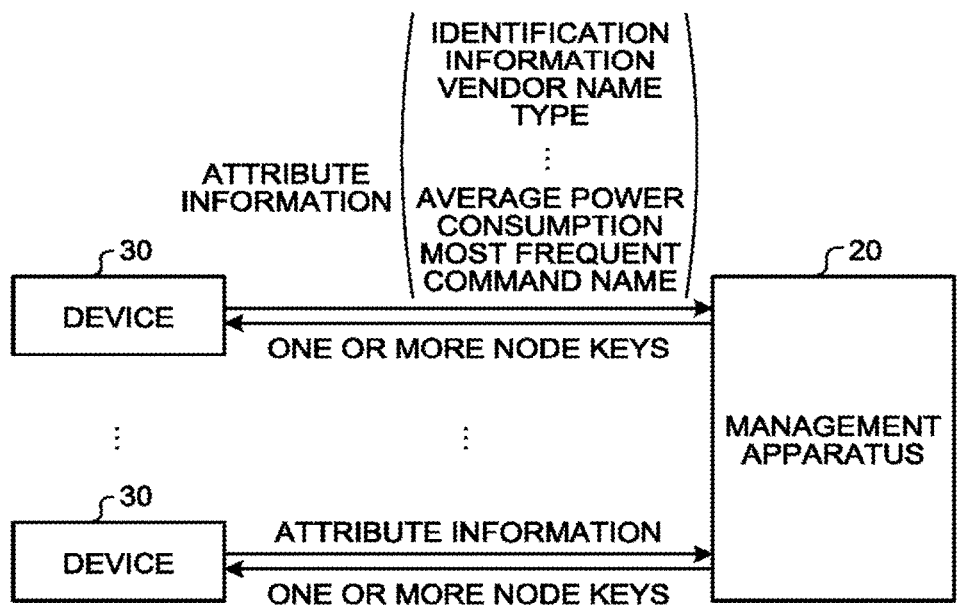
FIG. 4 is a diagram illustrating attribute information transmitted from a device to a management apparatus.
Figure 5:
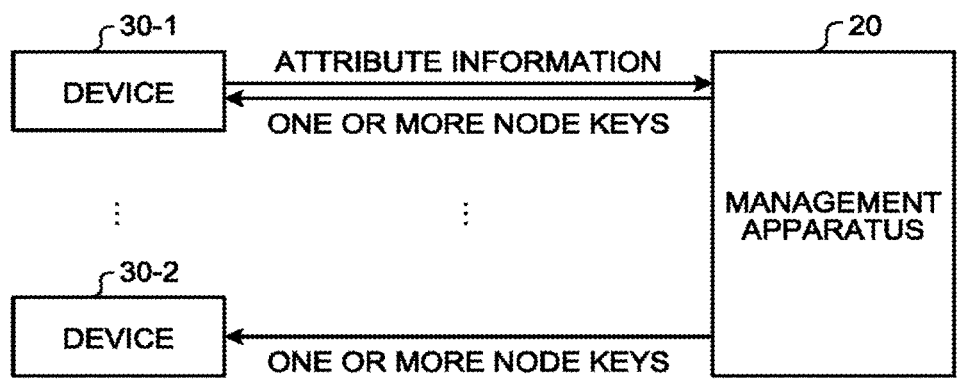
FIG. 5 is a diagram illustrating an example of transmission of node keys determined based on attribute information.

FIG. 4 is a diagram illustrating attribute information transmitted from the device 30 to the management apparatus 20 and the node key determined based on the attribute information and transmitted from the management apparatus 20 to the device 30. FIG. 5 is a diagram illustrating another transmission example of attribute information and the node key determined based on the attribute information.

A device 30 transmits attribute information representing the attribute of the device 30 to the management apparatus 20. The attribute information includes at least one element information. The attribute information includes, as element information, for example, identification information, vendor name, type, average power consumption, and most frequent command name. The details of the attribute information will be described later with reference to FIG. 8.

The management apparatus 20 determines one or more node keys to be assigned to each device 30, based on such attribute information, and transmits the determined node key(s) to the device 30. When the assignment of node key(s) to a device 30-1 involves a change of assignment of node key(s) to another device 30-2, the management apparatus 20 transmits the changed node key(s) to the device 30-2 as illustrated in FIG. 5.

Here, the management apparatus 20 receives the attribute information of a first device 30 and transmits at least one node key of node keys assigned to nodes on the path from the root node to the leaf node of the management tree information constructed based on the attribute information of e first device 30 and the attribute information of one or more second devices 30.

More specifically, the management apparatus 20 receives the first attribute information that is the attribute information of the first device 30 and transmits at least one node key of node keys assigned to nodes on the path from the root node to the second leaf node in the management tree information constructed by assigning the first device 30 to the second leaf node closest to the first leaf node. The first leaf node is a node to which the second device 30 is assigned. The second device 30 is a device 30 in which the second attribute information that is the attribute information of the second device 30 coincides with the first attribute information. In this case, the management apparatus 20 may additionally transmit at least one node key of node keys assigned to nodes on the path from the root node to the first leaf node of the management tree information.

The management apparatus 20 may receive attribute information of at least one or more devices 30 of a plurality of devices 30 and transmit at least one node key of node keys assigned to nodes on the path from the root node to each leaf node of the management tree information. In this case, the management tree information is such that, of a plurality of devices 30, a device 30 whose attribute information coincides with the received attribute information is assigned to the first leaf node, and of a plurality of devices 30, a device 30 whose attribute information does not coincide with the received attribute information is assigned to the second leaf node.

For example, when a new device 30 is assigned in the management tree information, the management apparatus 20 determines the assignment position (the position of the leaf node) based on the attribute information of the new device 30. More specifically, the management apparatus 20 determines the assignment position of the new device 30 such that devices 30 with similar attribute information are close to each other and devices 30 with dissimilar attribute information are far from each other. The management apparatus 20 thus can efficiently transmit information such as a group key with a small amount of information (the number of cyphertexts) to a plurality of devices 30 belonging to the same group.

Figure 6:
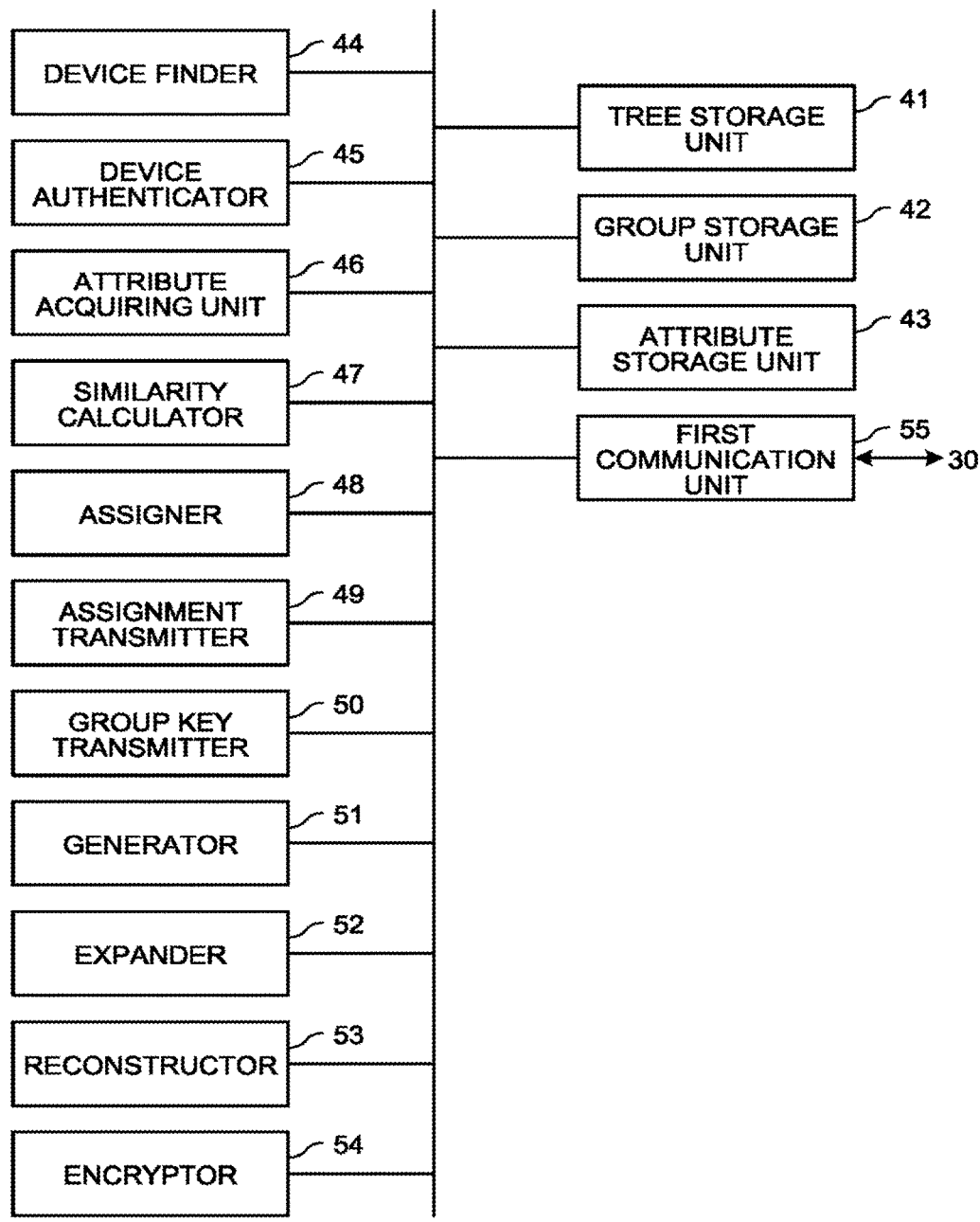
FIG. 6 is a diagram illustrating a configuration of the management apparatus.

FIG. 6 is a diagram illustrating a configuration of the management apparatus 20. The management apparatus 20 includes a tree storage unit 41, a group storage unit 42, an attribute storage unit 43, a device finder 44, a device authenticator 45, an attribute acquiring unit 46, a similarity calculator 47, an assigner 48, an assignment transmitter 49, a group key transmitter 50, a generator 51, an expander 52, a reconstructor 53, an encryptor 54, and a first communication unit 55.

The tree storage unit 41 stores therein management tree information in which node keys are respectively assigned to nodes and devices 30 are respectively assigned to leaf nodes. The group storage unit 42 stores therein a list of group identification information, group key, and member devices 30, for each group. The attribute storage unit 43 stores therein attribute information for each device 30.

The device finder 44 finds a device 30 existing on a network. The device authenticator 45 performs authentication with a device 30 and confirms whether the device 30 serving as a communication partner is duly authorized.

The attribute acquiring unit 46 acquires attribute information from the authenticated device 30. For example, when a new device 30 is connected to a network, the attribute acquiring unit 46 acquires attribute information from the new device 30. The attribute acquiring unit 46 may periodically acquire time-dependent element information of the attribute information from each device 30. The attribute acquiring unit 46 stores the acquired attribute information in the attribute storage unit 43.

The similarity calculator 47 calculates the similarity of attribute information between two devices 30. For example, when a new device 30 is connected to a network and the new device 30 is assigned in management tree information, the similarity calculator 47 calculates the similarity between the attribute information of the new device 30 and the attribute information of each device 30 already assigned to the management tree information.

The assigner 48 assigns a new device 30 in the management tree information stored in the tree storage unit 41. In this case, the assigner 48 determines the assignment position (the position of the leaf node) of the new device 30, based on the similarity between the attribute information of the new device 30 and the attribute information of the existing device 30 already assigned in the management tree information. More specifically, the assigner 48 determines the position of the leaf node to which the new device 30 is to be assigned, such that devices 30 with high similarity are arranged in a close range. For example, the assigner 48 assigns a new device 30 to an empty leaf node reachable via a predetermined number of edges from a leaf node assigned a device 30 whose similarity to the attribute information of the new device 30 is higher than a reference (for example, a device 30 with highest similarity).

When a new device 30 is assigned in management tree information, the assignment transmitter 49 encrypts at least one node key with a key shared through authentication and transmits the encrypted node key(s) to the new device 30. More specifically, the assignment transmitter 49 transmits, to the new device 30, at least one node key of node keys assigned to nodes on the path from the root node to the leaf node corresponding to the new device 30 in the management tree information. The new device 30 stores a set of the received at least one node key as a device key. The assignment transmitter 49 may encrypt and transmit the assignment position in management tree information and identification information of node key(s) to the new device 30.

The group key transmitter 50 generates a group key when a new group is formed. The group key transmitter 50 then transmits the group key to all of the devices 30 belonging to the formed new group. In this case, the group key transmitter 50 selects one or more node keys, at least one of which is held by all of the devices 30 belonging to the group and none of which is held by a device 30 not belonging to the group, and such that the number of cyphertexts is minimized. The group key transmitter 50 then encrypts the group key with the selected one or more node keys and transmits one or more cyphertexts.

When a new device 30 is assigned in management tree information and the new device 30 is added to any group, the group key transmitter 50 transmits the corresponding groin key to the new device 30. In this case, the group key transmitter 50 encrypts the corresponding group key with a node key held by the new device 30 and not held by a device 30 not belonging to the group.

The generator 51 generates new management tree information and stores the generated management tree information into the tree storage unit 41. For example, when a new device 30 is initially connected to a network and management information to be assigned does not exist in the tree storage unit 41, the generator 51 generates new management tree information and stores the generated new management tree information in the tree storage unit 41.

The expander 52 expands the management tree information stored in the tree storage unit 41 when the number of empty leaf nodes in management tree information is smaller than a predetermined number. For example, when a new device 30 is connected to a network and no empty leaf node exists in the management tree information stored in the tree storage unit 41, the expander 52 expands the management tree information. Expanding management tree information means adding new node and edge so as to increase leaf nodes included in the management tree information.

The reconstructor 53 reconstructs the management tree information stored in the tree storage unit 41. For example, the reconstructor 53 changes the assignment position of a device 30 to a leaf node in management tree information such that devices 30 with high similarity are arranged in a concentrated manner in a close range. More specifically, for example, the reconstructor 53 changes the assignment position of a device 30 to a leaf node in management tree information such that devices 30 having attribute information with similarity equal to or greater than a predetermined value belong to a range reachable via a predetermined number of edges. The reconstructor 53 executes reconstruction, for example, periodically or when a predetermined event occurs.

The encryptor 54 encrypts target data using a group key or a node key when data is transmitted from the management apparatus 20 to any device 30. When data is collectively transmitted to the devices 30 belonging to the specified group, the encryptor 54 encrypts target data with a group key. When data is transmitted to one or more specified devices 30, the encryptor 54 selects a node key held by the specified device(s) 30 and not held by other devices 30 and encrypts target data with the selected node key.

The first communication unit 55 communicates with devices 30 through a network. The first communication unit 55 executes, for example, the processing of physical layer, data link layer, and other layers for communicating with devices 30.

Figure 7:
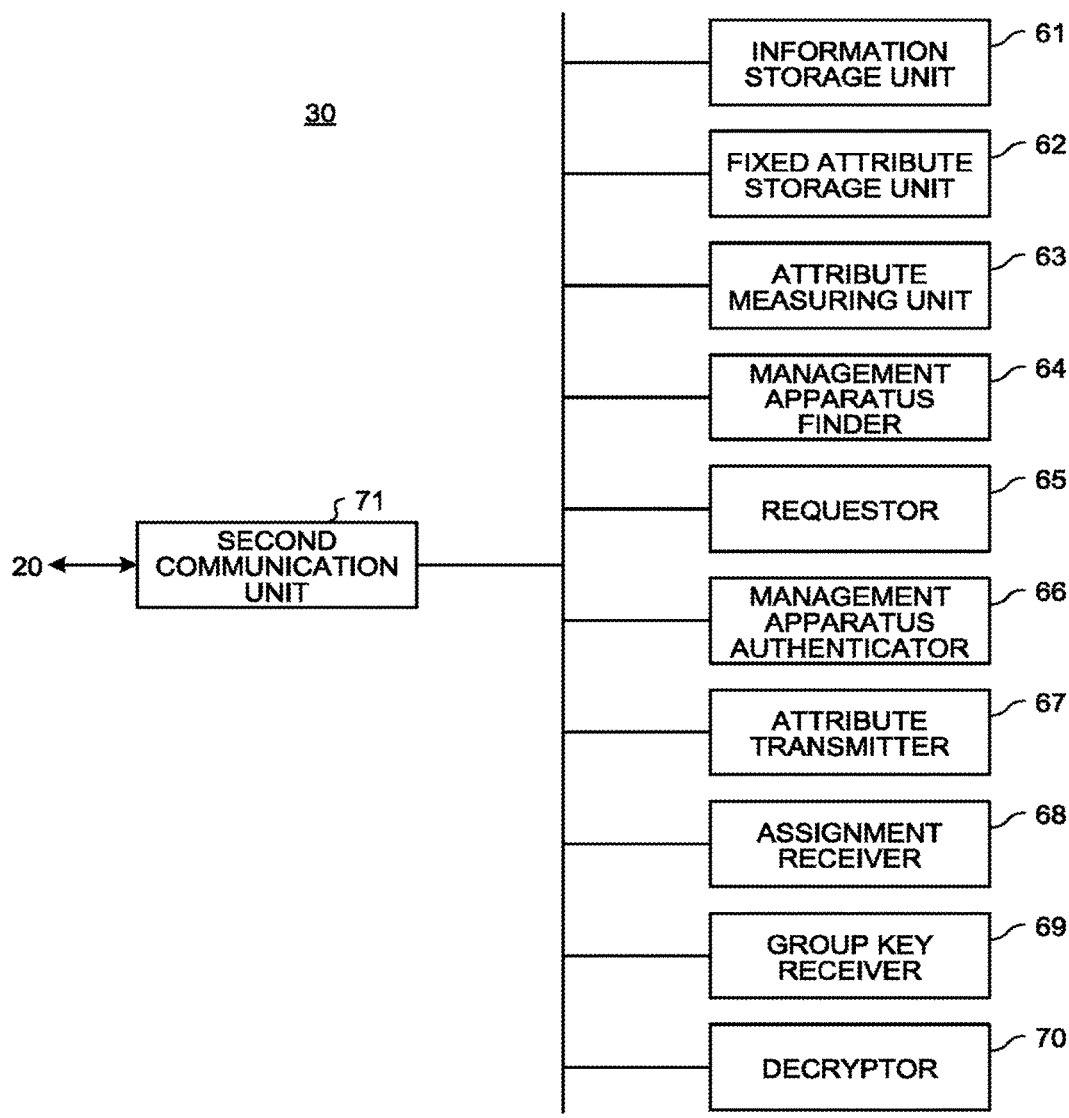
FIG. 7 is a diagram illustrating a configuration of the device.

FIG. 7 is a diagram illustrating a configuration of a device 30. The device 30 includes an information storage unit 61, a fixed attribute storage unit 62, an attribute measuring unit 63, a management apparatus finder 64, a requestor 65, a management apparatus authenticator 66, an attribute transmitter 67, an assignment receiver 68, a group key receiver 69, a decryptor 70, and a second communication unit 71.

The information storage unit 61 stores therein device key, which is a set of at least one node key assigned to this device 30. The information storage unit 61 may additionally store therein the identification information of each node key and the assignment position in management tree information. The information storage unit 61 additionally stores therein the group key of the group that this device 30 belongs to and the identification information of the group.

The fixed attribute storage unit 62 stores therein element information not changing with time, of the element information included in the attribute information. The attribute measuring unit 63 measures element information changing with time, of the element information included in the attribute information. The attribute measuring unit 63 may perform measurement periodically or may perform measurement when a predetermined event occurs.

The management apparatus finder 64 finds a management apparatus 20 present on a network. The requester 65 requests assignment into management tree information and issuance of a set of at least one node key from the management apparatus 20. For example, when this device 30 is newly connected to a network, the requestor 65 requests issuance of a set of at least one node key. The management apparatus authenticator 66 performs authentication with the management apparatus 20 and confirms whether the management apparatus 20 serving as a communication partner is duly authorized.

The attribute transmitter 67 transmits attribute information to the management apparatus 20. The attribute transmitter 67 transmits attribute information to the management apparatus 20, for example, at the time of requesting assignment into management tree information and issuance of a set of at least one node key. The attribute transmitter 67 may transmit time-dependent element information of the element information included in the attribute information to the management apparatus 20 periodically or when a predetermined event occurs.

The assignment receiver 68 receives at least one node key transmitted from the management apparatus 20. The assignment receiver 68 stores a set of the received least one node key in e information storage unit 61 as a device key. The assignment receiver 68 receives the assignment position of this device 30 in management tree information and the identification information of each node key. The assignment receiver 68 stores the received information in the information storage unit 61. When this device 30 is newly connected to a network, the node key, the assignment position, and the identification information of the node key are encrypted using a key shared through authentication with the management apparatus 20. The assignment receiver 68 decrypts the node key, the assignment position, and the identification information of the node key with this shared key.

The group key receiver 69 receives the encrypted group key from the management apparatus 20. The group key is encrypted using any node key of a set of at least one node key included in the device key held by this device 30. The group key receiver 69 then selects any node key from a of at least one node key included in the device key stored in the information storage unit 61 and decrypts the group key using the selected node key. The group key receiver 69 stores the decrypted group key in the information storage unit 61.

The decryptor 70 decrypts data transmitted from the management apparatus 20 using the group key or any node key included in the device key. The second communication unit 71 communicates with the management apparatus 20 and another device 30 through a network. The second communication unit 71 executes, for example, the processing of physical layer, data link layer, and other layers for communicating with the management apparatus 20 or another device 30.

FIG. 8 is a diagram illustrating elements included in the attribute information. The attribute information includes element information not changing with time (fixed element information) and element information changing with time (time-dependent element information). The attribute information may include one type of the fixed element information and the time-dependent element information.

Examples of the fixed element information include identification information, vendor name, type, memory capacity, and maximum power consumption. The identification information is information for uniquely identifying the device 30 on a network, for example, the MAC address, IP address, or serial number of the device 30. The vendor name is, for example, the manufacturer name or distributor name of the device 30. The type is the designation to identify the product function of the device 30. Specifically, the type is described as, for example, air conditioner, television set, and refrigerator.

The memory capacity is the value of capacity of the memory included in the device 30. The memory capacity is not limited to the capacity value and may be information as to whether the capacity value is greater than a predetermined threshold. The maximum power consumption is the maximum value of power consumed by the device 30.

Examples of the time-dependent element information include average power consumption, most frequent command name, and command frequency. The average power consumption is the average value of power consumed by the device 30 in a certain period (for example, from the start of operation up to the present time). The most frequent command name is the name of the control command most frequently executed by the device 30 in a certain period (for example, from the start of operation up to the present time). The command frequency is the frequency at which the device 30 executes a control command in a certain period (for example, from the start of operation up to the present time).

Other examples of the element information included in the attribute information include the model name, the cache capacity of the device, the name of the central processing unit (CPU), the rated power consumption, the communication scheme, network topology, the number of hops taken to reach the device 30 from the management apparatus 20, radio field intensity, the manufacturing date of the device 30, the installation location of the device 30, whether the device 30 is movable or fixed, and identification information of a peripheral device connected. The element information included in the attribute information may be of any combination.

Figure 9:
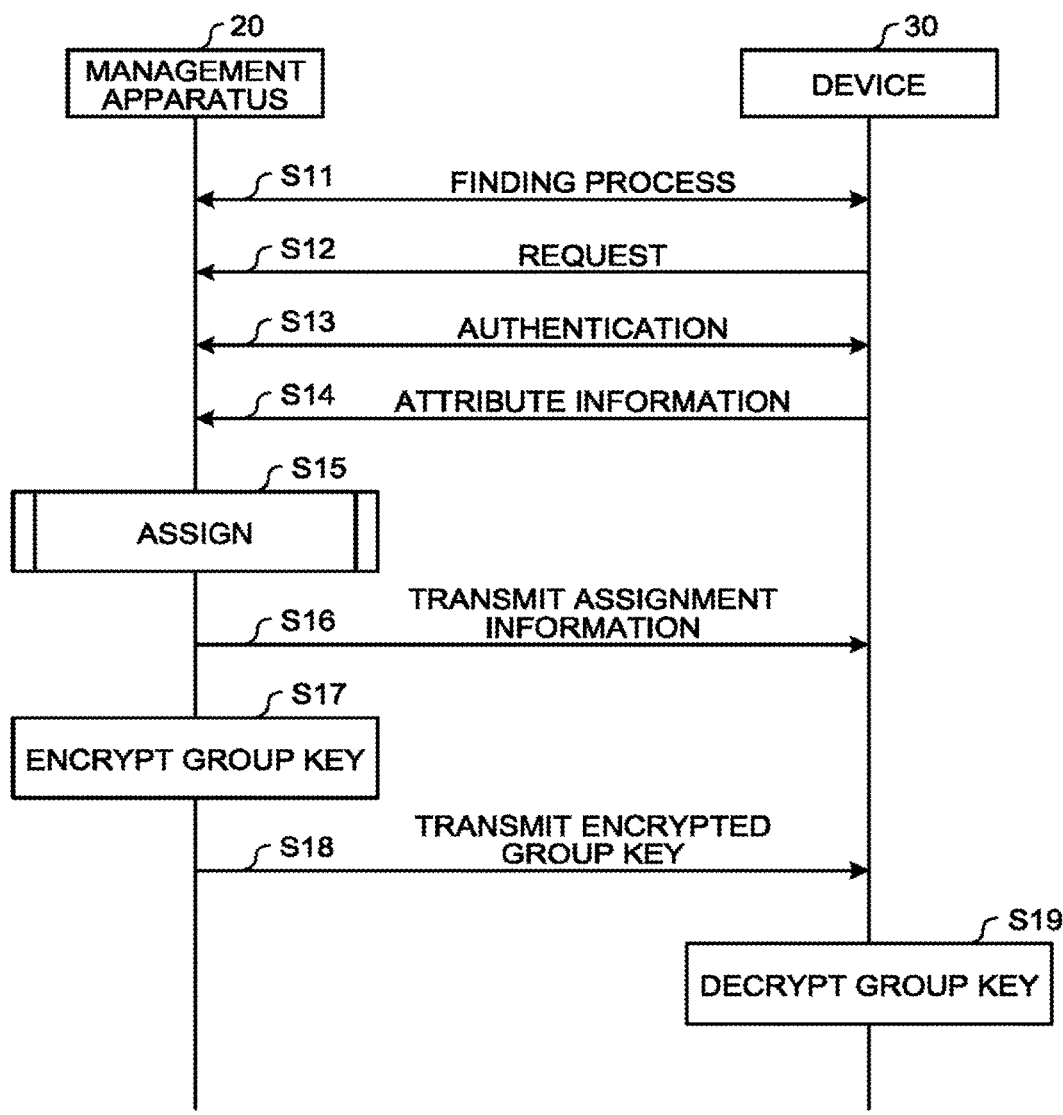
FIG. 9 is a sequence diagram of the communication system according to an embodiment.

FIG. 9 is a sequence diagram of the communication system 10 according to an embodiment. In the communication system 10, when a new device 30 is connected to a network, the processing is executed in accordance with the sequence illustrated in FIG. 9.

First of all, at step S11, the management apparatus 20 and the device 30 find each other through a network. Subsequently, at step S12, the device 30 requests assignment to management tree information and issuance of a set (device key) of at least one node key from the management apparatus 20.

Subsequently, at step S13, the management apparatus 20 and the device 30 mutually perform authentication to confirm whether the other party is duly authorized. The management apparatus 20 may execute the authentication for determining whether to connect to the device 30 at step S13, along with the processing at step S11 or step S12.

The management apparatus 20 and the device 30 perform authentication, for example, using a method such as ISO/IEC9798-1 or ISO/IEC9798-3. The management apparatus 20 and the device 30 may perform authentication by a method using a public key certificate. The management apparatus 20 and the device 30 may generate a key for use in authentication based on a password shared in advance or may use a private key embedded in the device 30 at the time of factory shipment as the key for use in authentication.

Subsequently, if it is confirmed that the communication partner is the authorized management apparatus 20, at step S14, the device 30 trans attribute information. In this case, the device 30 transmits element information not changing with time. If element information changing with time has already been measured, the device 30 may also transmit the element information changing with time.

The device 30 may transmit attribute information at any time before the subsequent assignment process (S15). For example, if UPnP SSDP is used in the finding process (S11), the device 30 may include the attribute information in one entry of the device description to transmit the attribute information. If HTTP is used for the protocol in the request process (S12), the device 30 may define dedicated field as one entity of the HTTP request header to transmit the attribute information or may include the storage location of the attribute information in the URL of the HTTP GET request.

Subsequently, at step S15, the management apparatus 20 executes assignment process for assigning the device 30 to any one of leaf nodes in the management tree information. The assignment process will be described later with reference to FIG. 10.

Subsequently, at step S16, the management apparatus 20 transmits the assignment information obtained through the assignment process at step S15 to the device 30. The assignment information includes a set (device key) of at least one node key assigned to the corresponding device 30. The assignment information may include the assignment position in the management tree information and the identification information of each node key. The management apparatus 20 encrypts the assignment information with the key shared through the authentication and transmits the encrypted assignment information to the device 30.

Subsequently, at step S17, the management apparatus 20 acquires the group key of the group that the corresponding device 30 belongs to and encrypts the acquired group key with one or more node keys of the at least one node key transmitted to the device 30 at step S16. In this case, the management apparatus 20 encrypts the group key with a node key not held by devices 30 outside the group.

Subsequently, at step S16, the encrypted group key is transmitted to the device 30. Subsequently, at step S19, the device 30 receives the encrypted group key from the management apparatus 20, selects any one node key of a set (device key) of the held at least one node key, and decrypts the group key with the selected node key. Through the processing as described above, the device 30 can acquire a set (device key) of at least one node key and the group key from the management apparatus 20.

Figure 10:
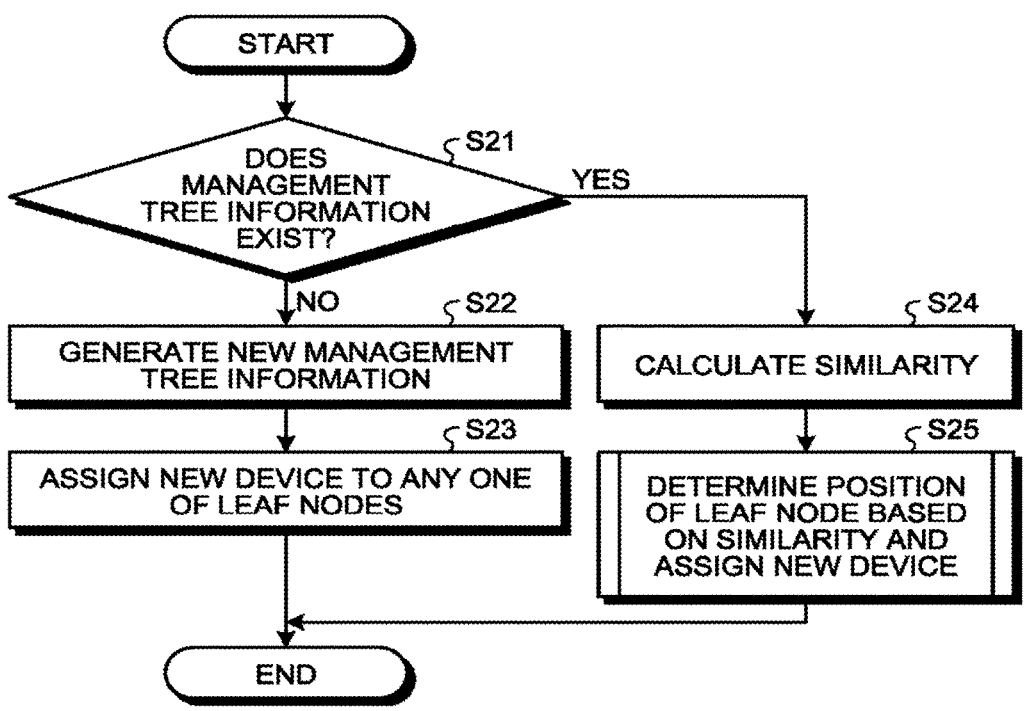
FIG. 10 is a flowchart of assignment by the management apparatus.

FIG. 10 is a flowchart of the assignment by the management apparatus 20. The management apparatus 20 executes the processing illustrated in FIG. 10 in the assignment process (S15).

First of all, at step S21, the generator 51 of the management apparatus 20 determines whether management tree information exists in the tree storage unit 41. If no management tree information exists (No at S21), at step S22, the generator 51 generates new management tree information and stores the generated management tree information in the tree storage unit 41. In this case, the generator 51 generates management tree information of predetermined i levels (i is an integer equal to or greater than 2). The level of management tree information represents the number of edges of the route from a root node to a leaf node. Subsequently, at step S23, the assigner 48 of the management apparatus 20 assigns a new device 30 to any one of leaf nodes in the new management tree information. When step S23 is finished, the management apparatus 20 terminates the assignment process.

In contrast, if management tree information exists (Yes at S21), at step S24, the similarity calculator 47 of the management apparatus 20 calculates the similarity between the attribute information of the new device 30 and the attribute information of each device 30 already assigned to the management tree information.

When the similarity between two pieces of attribute information is calculated, the similarity calculator 47 makes a comparison, for example, as to whether the corresponding element information is identical with each other or whether the difference of values falls within a certain range. For example, the similarity calculator 47 makes a comparison as to whether the vendor names are identical, whether the types are identical, whether the difference in memory capacity falls within a certain range, whether the difference in maximum power consumption falls within a certain range, whether the difference in average power consumption falls within a certain range, whether the most frequent command names are identical, and whether the difference in command frequency falls within a certain range.

The similarity calculator 47 then synthesizes the comparison results of a plurality of pieces of element information to calculate the similarity. For example, the similarity calculator 47 counts 1 point if element information is identical or the difference in value falls within a certain range; counts 0 points if the element information is not identical or the difference in value exceeds a certain range; and sets the sum of points of a plurality of pieces of element information as the similarity.

Alternatively, the similarity calculator 47 may extract and compare predetermined one or more pieces of particular element information, rather than making a comparison for all element information in the attribute information. For example, the similarity calculator 47 may compare types and average power consumption and synthesize the comparison results to calculate the similarity.

Alternatively, the similarity calculator 47 may synthesize the comparison results by giving weights different for each piece of element information. The similarity calculator 47 may give different weights, for example, 5 points if the types coincide with each other, 2 points if the vendor names coincide with each other, and 4 points if the difference in value of average power consumption falls within a certain range. The similarity calculator 47 may calculate the similarity by any other calculation methods, instead of the aforementioned calculation methods.

Subsequently, at step S25, the assigner 48 assigns the new device 30 to any one of leaf nodes in the management tree information, based on the calculated similarity. In this case, the assigner 48 assigns the new device 30 to any one empty leaf node such that similar devices 30 are arranged nearby in a concentrated manner. For example, the assigner 48 assigns the new device 30 to an empty leaf node that is reachable within a certain number of edges from the device 30 with highest similarity to the attribute information of the new device 30. If there exists no empty leaf node that is reachable within a certain number of edges from the device 30 with highest similarity, the assigner 48 may assign the new device 30 after allowing the expander 52 to expand the management tree information.

When step S25 is finished, the management apparatus 20 terminates the assignment process.

Figure 11:
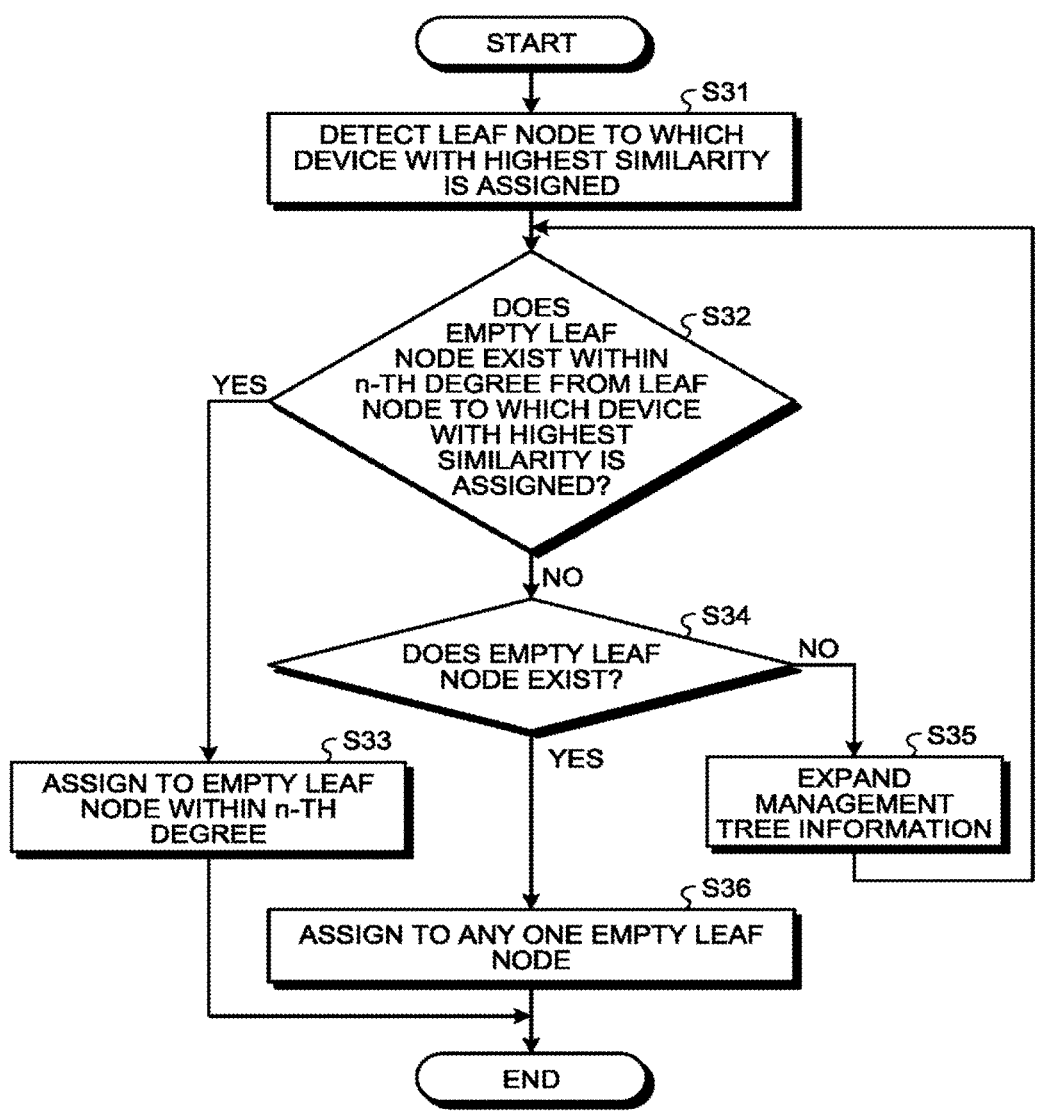
FIG. 11 is a flowchart illustrating an example of the processing at step S25 in FIG. 10.

FIG. 11 is a flowchart illustrating an example of the processing at step S25 in FIG. 10. The assigner 48 may execute, for example, the processing as illustrated in FIG. 11, at step S25 in FIG. 10.

First of all, at step S31, the assigner 48 detects a leaf node to which, of the devices 30 already assigned to the management tree information, a device 30 with highest similarity to the attribute information of the new device 30 is assigned.

Subsequently, at step S32, the assigner 45 determines whether an empty leaf node exists within the n-th degree from the leaf node to which the device 30 with highest similarity is assigned. Here, the leaf node within the n-th degree (n is an integer equal to or greater than 1) refers to another leaf node that is reachable within the number of edges equal to or smaller than n from a leaf node to which a certain device 30 is assigned. For example, in the example illustrated in FIG. 2, the degree of relation between leaf node 8 and leaf node 9 is two. The degree of relation between leaf node 8 and leaf node 12 is 6.

If an empty leaf node exists within the n-th degree from the leaf node to which the device 30 with highest similarity is assigned (Yes at S32), at step S33, the assigner 48 assigns the new device 30 to the empty leaf node within the n-th degree. That is, the assigner 48 assigns the new device 30 to the empty leaf node that is reachable via a predetermined number of edges from the leaf node to which the device 30 with highest similarity is assigned. The assigner 48 thus can assign the new device 30 to the position close to the existing device 30 having the most similar attribute information in the management tree information.

At step S31, the assigner 48 may detect a leaf node to which the device 30 with highest similarity is assigned, among those with similarity equal to or higher than a reference value. In this case, if there exists no device 30 with similarity equal to or higher than a reference value, conversely, the assigner 48 may assign the new device 30 to an empty leaf node farther than the n-th degree. The assigner 48 thus can assign the new device 30 to a position far from the existing device 30 whose attribute information is not similar in the management tree information.

When step S33 is finished, the management apparatus 20 returns to the processing in FIG. 10.

On the other hand, if there exists no empty leaf node within the n-th degree from the leaf node to which the device 30 with highest similarity is assigned (No at S32), at step S34, the assigner 48 determines whether there exists an empty leaf node in the management tree information. If no empty leaf node exists in the management tree information (No at S34), the assigner 48 proceeds to step S35. If an empty leaf node exists in the management tree information (Yes at S34), the assigner 48 proceeds to step S36.

At step S35, the expander 52 expands the tree structure of the management tree information. The expander 52 thus can create an empty leaf node in the management tree information. After the expander 52 expands the management tree information, the process returns to step S32 and process repeats. After the expander 52 expands the management tree information, the process may proceed to step S36. The process of expanding the management tree information will be described later with reference to FIG. 14 to FIG. 20.

At step S36, the assigner 48 assigns the new device 30 to any one empty leaf node. After step S36 is finished, the management apparatus 20 returns to the processing in FIG. 10.

At step S34, the assigner 48 may determine whether the number of empty leaf nodes existing in the management tree information is equal to or greater than a predetermined number, rather than determining whether an empty leaf node exists in the management tree information. In this case, if the number of empty leaf nodes existing is not equal to or greater than a predetermined number, the assigner 48 proceeds to step S35. If the number of existing empty leaf nodes is equal to or greater than the predetermined number, the assigner 48 proceeds to step S36.

Figure 12:
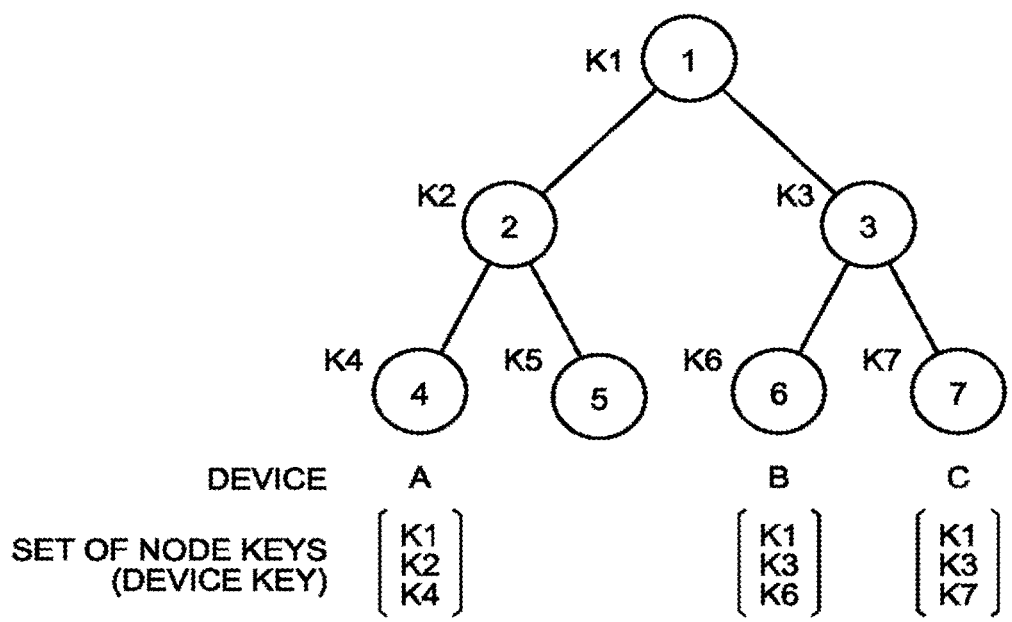
FIG. 12 is a diagram illustrating a first assignment example.

FIG. 12 is a diagram illustrating a first example of assignment of devices 30 into management tree information. For example, as illustrated in FIG. 12, it is assumed that the management tree information is a structure of two-level perfect binary tree, in which a first device 30-A is assigned to a leaf node of node number 4, a second device 30-B is assigned to a leaf node of node number 6, and a third device 30-C is assigned to a leaf node of node number 7. In the example in FIG. 12, the first device 30-A holds a set (device key) of three node keys K1, K2, and K4. The second device 30-B holds a set (device key) of three node keys K1, K3, and K6. The third device 30-C holds a set (device key) of three node keys K1, K3, and K7.

In the example in FIG. 12, when the first device 30-A and the second device 30-E are to execute a control command CME, the management apparatus 20 generates and transmits two cyphertexts represented by the formulae below. The first device 30-A and the second device 30-B thus can hold a group key GK. $E(K, M)$ is a cyphertext obtained by encrypting data M using a key K.

$$C1=E(K4,GK)$$

$$C2=E(K6,GK)$$

Subsequently, the management apparatus 20 encrypts the control command CMD using the group key GK as represented by the formula below and multicasts the cyphertext.

$$C3=E(GK,CMD)$$

The first device 30-A and the second device 30-B decrypt the received cyphertext using the group key GK. The first device 30-A and the second device 30-B thus can execute the control command CME. In this way, when the management tree information is constructed as illustrated in FIG. 12, the management apparatus 20 can transmit three cyphertexts to allow the first device 30-A and the second device 30-B to execute the control command CMD.

in the example in FIG. 12, the management apparatus 20 may allow the first device 30-A and the second device 30-B to execute the control command CMD without transmitting the group key GK. In this case, the management apparatus 20 generates and transmits cyphertexts represented by the formulae below. When the group key GK is not transmitted, the management apparatus 20 can transmit two cyphertexts to allow the first device 30-A and the second device 30-B to execute the control command CMD.

$$C1'=E(K4,CMD)$$

$$C2'=E(K6,CMD)$$

Figure 13:
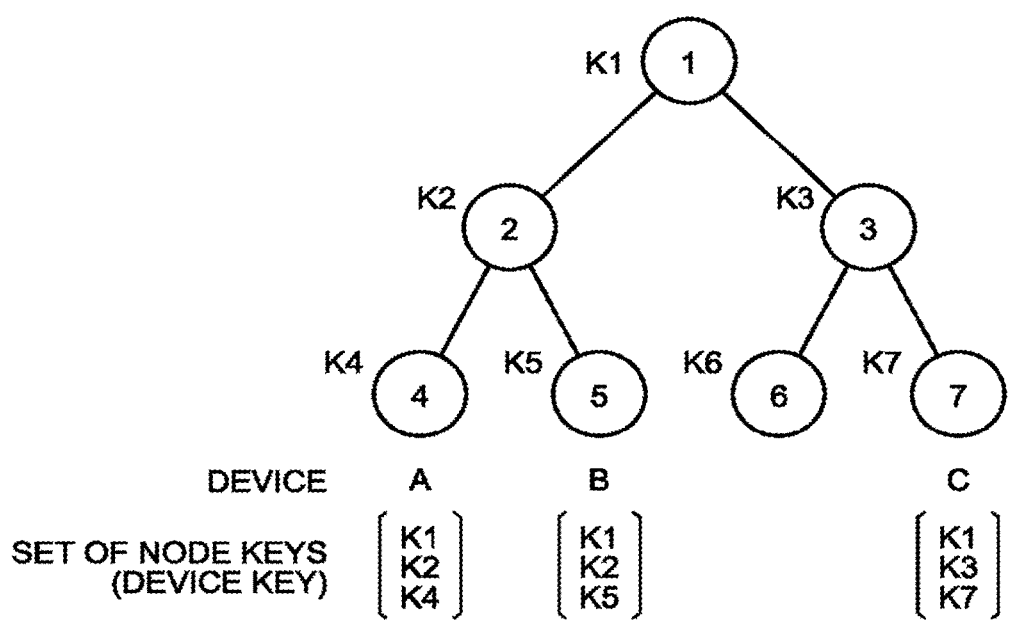
FIG. 13 is a diagram illustrating a second assignment example.

FIG. 13 is a diagram illustrating a second example of assignment of devices 30 into management tree information. The management tree information illustrated in FIG. 13 differs from that of FIG. 12 in that the second device 30-B is assigned to a node of node number 5. In the example in FIG. 13, the second device 30-2 holds a set (device key) of three node keys K1, K2, and K5.

In the example in FIG. 13, in order to allow the first device 30-A and the second device 30-B to execute a control command CMD, first of all, the management apparatus 20 generates and multicasts a cyphertext represented by the formula below. The first device 30-A and the second device 30-B thus can hold a group key GK.

$$C1''=E(K2,GK)$$

Subsequently, the management apparatus 20 encrypts the control command CMD using the group key GK as represented by the formula below and multicasts the cyphertext.

$$C3=E(GK,CMD)$$

The first device 30-A and the second device 30-B decrypt the received cyphertext using the group key GK. The first device 30-A and the second device 30-B thus can execute the control command CMD. As described above, when the management tree information is constructed as illustrated in FIG. 13, the management apparatus 20 can transmit two cyphertexts to allow the first device 30-A and the second device 30-B to execute the control command CMD.

In the example in FIG. 13, the management apparatus 20 may allow the first device 30-A and the second device 30-B to execute the control command CMD without transmitting the group key GK. In this case, the management apparatus 20 generates and multicasts a cyphertext represented by the formula below. When the group key GK is not transmitted in this way, the management apparatus 20 can transmit one cyphertext to allow the first device 30-A and the second device 30-B to execute the control command CMD.

$$C1'''=E(K2,CMD)$$

As described above, when the first device 30-A and the second device 30-B are to execute the same control command CMD, the management tree information in FIG. 13 is more efficient than in the management tree information in FIG. 12 because the volume of data transmission can be reduced.

Here, the management tree information in FIG. 12 and the management tree information in FIG. 13 are compared. In the management tree information in FIG. 12, the distance between the leaf node to which the first device 30-A is assigned and the leaf node to which the second device 30-B is assigned is the fourth degree. By contrast, in the management tree information in FIG. 13, the distance between the leaf node to which the first device 30-A is assigned and the leaf node to which the second device 30-B is assigned is the second degree. That is, in the management tree information in FIG. 13, the first device 30-A and the second device 30-B are assigned in a closer range than in the management tree information in FIG. 12. Based on this, the volume of transmitted information (the number of cyphertexts) can be reduced when devices 30 belonging to one group are assigned to near leaf nodes in the management tree information, compared with when they are assigned to far leaf nodes.

The management apparatus 20 is likely to transmit identical data simultaneously to a plurality of devices 30 having attribute information with high similarity. For example, to suppress the power consumption of the communication system 10 as a whole, the management apparatus 20 is likely to transmit a control command or the like to reduce the power consumption simultaneously to a plurality of air conditioners. The management apparatus then assigns a plurality of devices 30 having attribute information with high similarity to leaf nodes within a predetermined range in the management tree information, thereby reducing the volume of transmitted information (the number of cyphertexts).

The management apparatus 20 according to the present embodiment assigns devices 30 having attribute information with high similarity to nearby locations in the management tree information. Accordingly, the management apparatus 20 enables efficient transmission of data to a plurality of devices 30 with a small amount of information.

Expansion of Management Tree Information

For example, when a new device 30 is assigned to management tree information, if the number of empty leaf nodes in the management tree information is smaller than a predetermined number (for example, when no empty leaf node exists), the expander 52 expands the management tree information.

Alternatively, the expander 52 may expand the management tree information when no empty leaf node exists within the n-th degree from the leaf node of the device 30 having attribute information with highest similarity to the new device 30 in the management tree information. Alternatively, the expander 52 may expand the management tree information periodically or when a predetermined event occurs and if the number of empty leaf nodes in the management tree information is smaller than a predetermined number. Alternatively, the expander 52 may expand the management tree information, for example, every time the number of devices 30 connected to the network exceeds a predetermined number.

An example of the expansion of management tree information and a method of transmitting a node key after expansion will be described below.

Figure 14:
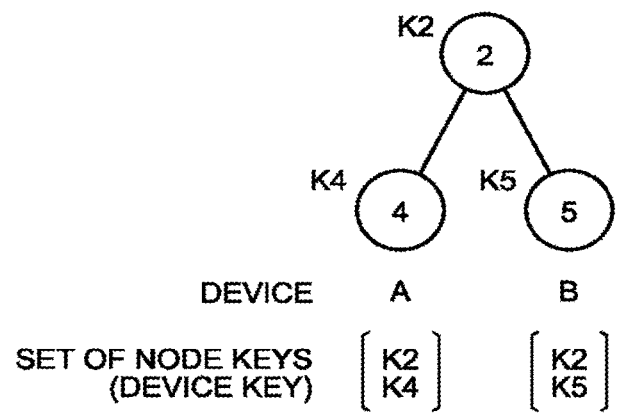
FIG. 14 is a diagram illustrating a first example of management tree information before expansion.

FIG. 14 is a diagram illustrating a first example of the management tree information before expansion. For example, as illustrated in FIG. 14, it is assumed that the management tree information is a structure of one-level perfect binary tree, in which a first device C-A is assigned to a leaf node of node number 4, and a second device 30-B is assigned to a leaf node of node number 5. In the example in FIG. 14, the first device 30-A holds a set (device key) of two node keys K2 and K4. The second device 30-B holds a set (device key) of two node keys K2 and K5.

In such a case, the assigner 48 is unable to assign a new device 30 in the management tree information. The expander 52 then adds an additional node, for example, to a level higher than the existing root node in the management tree information.

Figure 15:
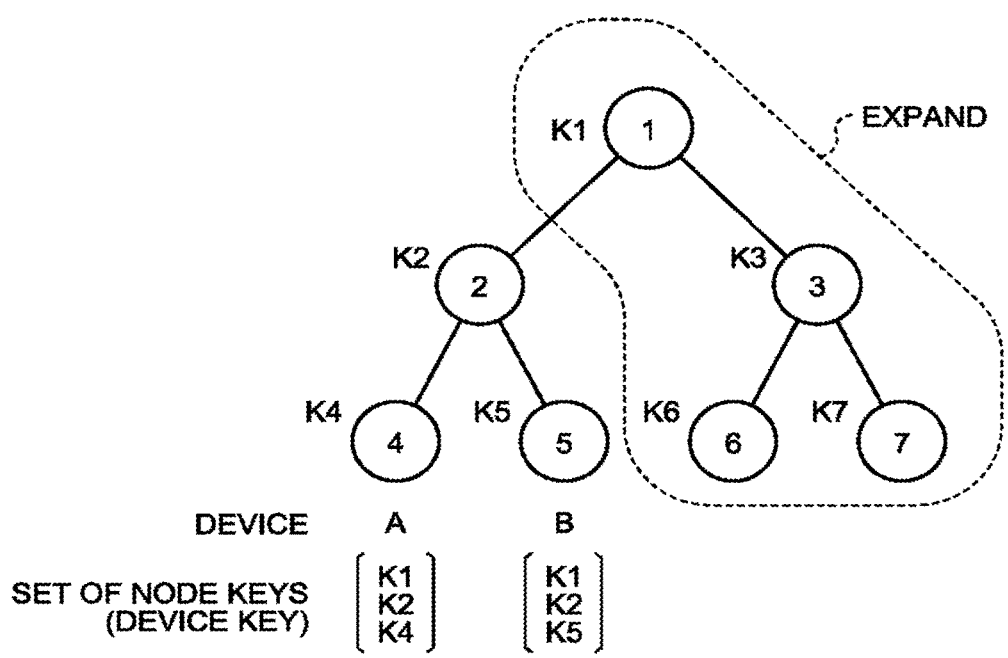
FIG. 15 is a diagram illustrating an example of expansion of a higher level.

FIG. 15 is a diagram illustrating an example in which a new node is added to a level higher than the root node in the management tree information in FIG. 14. In the example in FIG. 15, the expander 52 adds a new root node of node number 1, for example, to a level higher than the original root node of node number 2. In addition, the expander 52 adds a subtree of one-level perfect binary tree to a level lower than the root node of node number 1. The expander 52 thus forms two new empty leaf nodes in the management tree information to enable assignment of a new device 30.

Subsequently, the assignment transmitter 49 transmits the new node key assigned to the expanded node in the management tree information to the devices 30 already assigned in the management tree information. In this case, the assignment transmitter 49 encrypts the new node key assigned to the expanded node, using the node key that has been assigned to the existing node and is held only by the transmission target device 30, and transmits the encrypted new node key.

In the example in FIG. 15, the assignment transmitter 49 encrypts the node key K1 assigned to the expanded node of node number 1 using the node key K2 assigned to the existing node of node number 2, as represented by the formula below, and multicasts the encrypted node key to the first device 30-A and the second device 30-B.

$$C4=E(K2,K1)$$

Thus, the existing first device 30-A and second device 30-B assigned in the management tree information before expansion can hold all of the node keys assigned from the root node to the corresponding leaf node in the management tree information after expansion. In the example in FIG. 15, the first device 30-A can hold a set (device key) of three node keys K1, K2, and K4, and the second device 30-B can hold a set (device key) of three node keys K1, K2, and K5.

In this way, the management tree information is expanded to a level higher than the root node, so that the assignment transmitter 49 can transmit the new node key assigned to the expanded node in the management tree information to the existing device 30 after encrypting the new node key using the already held node key. In particular, in this case, the assignment transmitter 49 only has to encrypt a new node key with one node key that has been assigned to the original root node, thereby reducing the volume of transmitted information.

Figure 16:
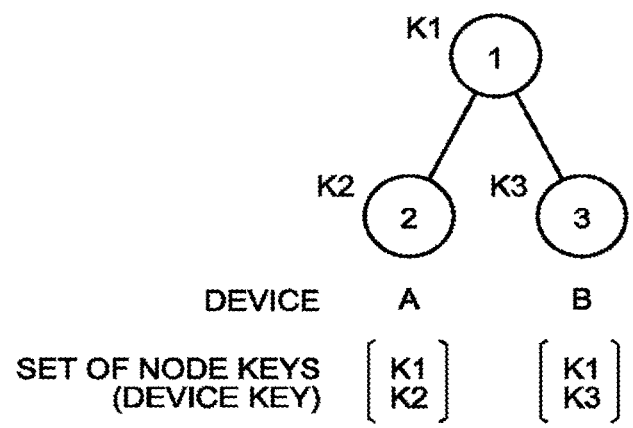
FIG. 16 is a diagram illustrating a second example of management tree information before expansion.

FIG. 16 is a diagram illustrating a second example of the management tree information before expansion. For example, as illustrated in FIG. 16, it is assumed that the management tree information is a structure of one-level perfect binary tree, in which a first device 30-A is assigned to a leaf node of node number 2 and a second device 30-B is assigned to a leaf node of node number 3. In the example in FIG. 16, the first device 30-A holds a set (device key) of two node keys K1 and K2. The second device 30-B holds a set (device key) of two node keys K1 and K3.

In such a case, the assigner 48 is unable to assign a new device 30 to the management tree information. The expander 52 then may add an additional node to, for example, a level lower than the existing leaf node in the management tree information. In this case, the expander 52 reassigns the device 30 that has been assigned to the existing leaf node below which a node is added, to a new leaf node. The expander 5 may add an additional node, for example, to the intermediate level between the existing leaf node and the root node in the management tree information.

Figure 17:
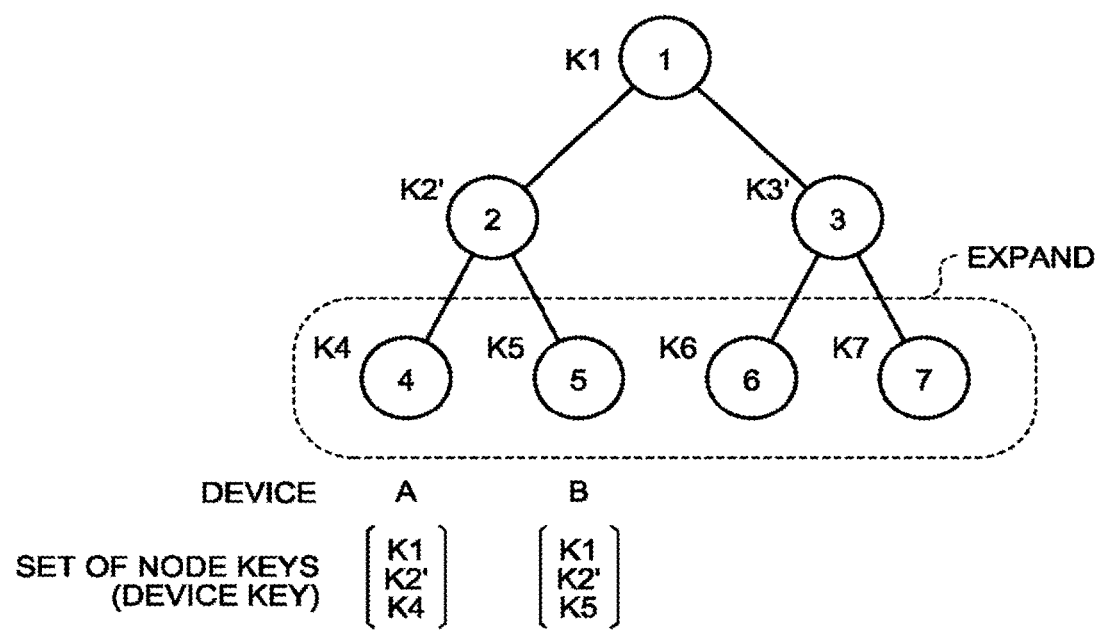
FIG. 17 is a diagram illustrating an example of expansion on a lower level.

FIG. 17 is a diagram illustrating an example in which a new node is added to a level lower than the leaf node in the management tree information in FIG. 16. In the example in FIG. 17, the expander 52 adds, for example, two new leaf nodes of node number 4 and node number 5 to a level lower than the original leaf node of node number 2. In addition, the expander 52 adds two new leaf nodes of node number 6 and node number 7 to a level lower than node number 3.

In the example in FIG. 17, the expander 52 reassigns the first device 30-A that has been assigned to the original leaf node of node number 2, to the new leaf node of node number 4. The expander 52 also reassigns the second device 30-B that has been assigned to the original leaf node of node number 3, to the new leaf node of node number 5. The expander 52 thus forms two new empty leaf nodes in the management tree information to enable assignment of a new device 30.

In the example in FIG. 17, the expander 52 reassigns new node keys K2' and K3' to the original leaf nodes, that is, the nodes of node number 2 and node number 3.

Subsequently, the assignment transmitter 49 encrypts a new node key to be held, using the node key that has been assigned to the existing node and is held only by the transmission target device 30, and transmits the encrypted new node key to the device 30 already assigned in the management tree information. In the example in FIG. 17, the assignment transmitter 49 encrypts the new node keys K2' and K4 with the node key K2 assigned to the existing node of node number 2, as represented by the formulae below, and transmits the encrypted node keys to the first device 30-A. The node key K2 is held only by the transmission target first device 30-A and is not held by the second device 30-B. The first device 30-A thus can hold a set (device key) of three node keys K1, K2', and K4.

$C5=E(K2,K2')$ $C6=E(K2,K4)$

In the example in FIG. 17, the assignment transmitter 49 encrypts the new node keys K2' and K5 with the node key K3 assigned to the existing node of node number 3, as represented by the formulae below, and transmits the encrypted node keys to the second device 30-B. The node key K3 is held only by the transmission target second device 30-B and is not held by the first device 30-A. The second device 30-B thus can hold a set (device key) of three node keys K1, K2', and K5.

$C7=E(K3,K2')$ $C8=E(K3,K5)$

In this way, the management tree information is expanded to a level lower than the leaf node, so that the assignment transmitter 49 can transmit a new node key assigned to the expanded node in the management tree information to the existing device 30 after encrypting the new node key using the already held node key. The expander 52 may set K2'=K2. This setting can further reduce the volume of transmitted information because the assignment transmitter 49 does not have to transmit the node key K2 to the first device 30-A.

Figure 18:
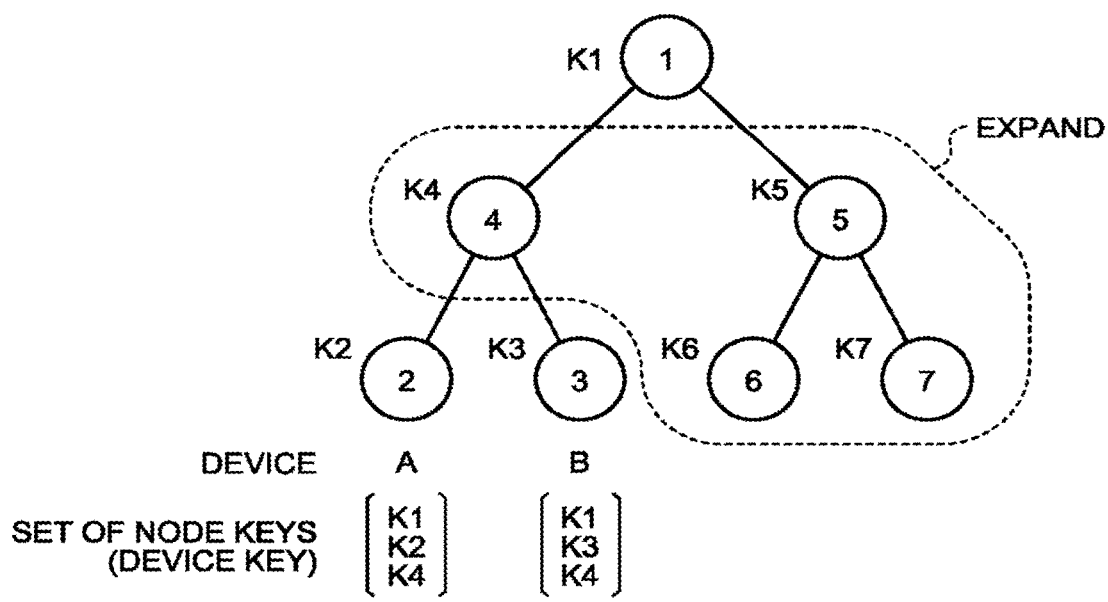
FIG. 18 is a diagram illustrating an example of expansion on an intermediate level.

FIG. 18 is a diagram illustrating an example in which a new node is added to the level between the root node and the leaf node in the management tree information in FIG. 16. For example, the expander 52 may add an additional new node to the level between the root node and the leaf node in the management tree information.

In the example in FIG. 18, the expander 52 newly adds, for example, a node of node number 4 to a level lower than the root node of node number 1. The expander 52 then connects the leaf node of node number 2 and the leaf node of node number 3 to a level lower than the node of node number 4. In addition, the expander 52 adds a subtree of one-level perfect binary tree to a level lower than the root node of node number 1. The expander 52 thus forms two new empty leaf nodes in the management tree information to enable assignment of a new device 30.

Subsequently, the assignment transmitter 49 transmits the node key assigned to the added node of node number 4 to the first device 30-A and the second device 30-B already assigned in the management tree information. In the example in FIG. 18, the assignment transmitter 49 encrypts the new node key K4 with each of the node key K2 assigned to the existing node of node number 2 and the node key K3 assigned to the existing node of node number 3, as represented by the formulae below, and multicasts the encrypted node keys to the first device 30-A and the second device 30-B. The first device 30-A thus can hold a set (device key) of three node keys K1, K2, and K4. The second device 30-B can also hold a set of three node keys K1, K3, and K4.

$C9=E(K2,K4)$ $C10=E(K3,K4)$

In this way, a new node is further added to the level between the root node and the leaf node in the management tree information, so that the assignment transmitter 49 can encrypt the node key assigned to the added new node with the node key assigned to the existing node and transmit the encrypted node key. The assignment transmitter 49 thus can reduce the volume of transmitted information.

The assignment transmitter 49 may be configured to encrypt the new node key K4 with the node key K1 assigned to the existing node of node number 1, as represented by the formula below, and multicast the encrypted node key to the first device 30-A and the second device 30-B. Also in this configuration, the first device 30-A can hold a set (device key) of three node keys K1, K2, and K4. The second device 30-B can also hold a set (device key) of three node keys K1, K3, and K4. This configuration can further reduce the volume of transmitted information because the assignment transmitter 49 only has to transmit one cyphertext.

$C11=E(K1,K4)$

Figure 19:
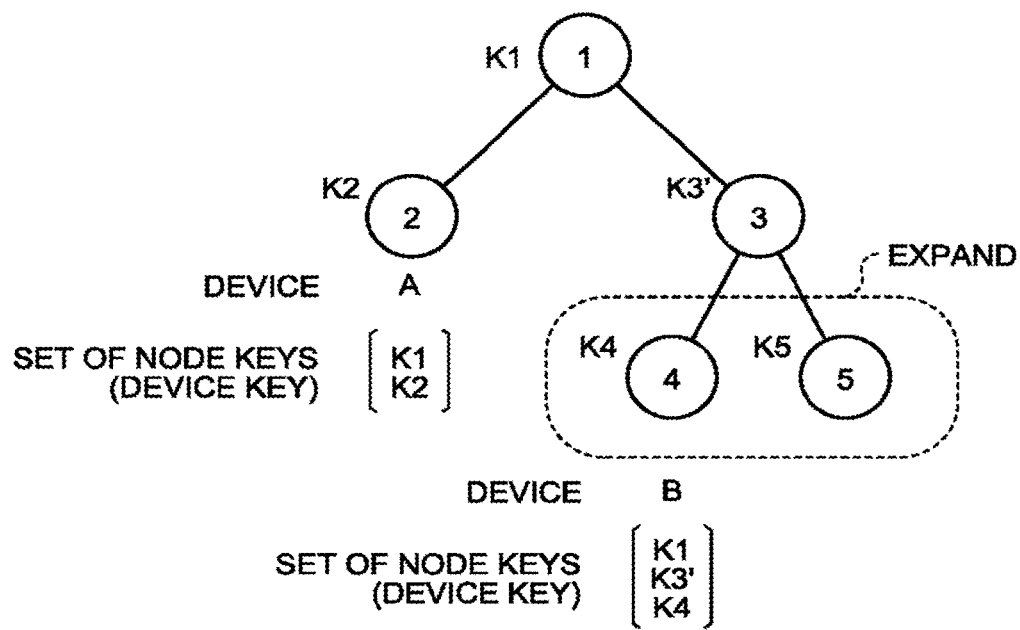
FIG. 19 is a diagram illustrating an example of expansion on a level lower than one of leaf nodes.

FIG. 19 is a diagram illustrating an example in which a new node is added to a level lower than one of the leaf nodes in the management tree information in FIG. 10. The expander 52 may add an additional node, for example, to a level lower than any one of the existing leaf nodes in the management tree information. In this case, the expander 52 reassigns the device 30 that has been assigned to the existing leaf node below which a node is added, to a new leaf node.

In the example in FIG. 19, the expander 52 adds, for example, two new leaf nodes of node number 4 and node number 5 to a level lower than the original leaf node of node number 3. In the example in FIG. 19, the expander 52 reassigns the second device 30-B that has been assigned to the original leaf node of node number 3, to a new leaf node of node number 4. The expander 52 thus forms one new empty leaf node in the management tree information to enable assignment of a new device 30. In the example in BIG. 19, the expander 52 reassigns a new node key K3' to the original leaf node, that is, the node of node number 3.

Subsequently, the assignment transmitter 49 transmits a new node key to be held to the second device 30-B reassigned to a different position. In the example in FIG. 19, the assignment transmitter 49 encrypts new node keys K3' and K4 with the node key K3 assigned to the existing node of node number 3, as represented by the formulae below, and transmits the encrypted node keys to the second device 30-B. The second device 30-B thus can hold a set. (device key) of three node keys K1, K3', and K4.

$C12=E(K3,K3')$ $C13=B(K3,K4)$

In this way, the management tree information is expanded to a level lower than one of the leaf nodes whereby the assignment transmitter 49 can transmit a new node key assigned to the expanded node in the management tree information to the existing device 30 after encrypting the new node key using the already held node key. The expander 52 may set K3'=K3. This setting can reduce the volume of transmitted information because the assignment transmitter 49 does not have to transmit the node key K3 to the second device 30-B.

Figure 20:
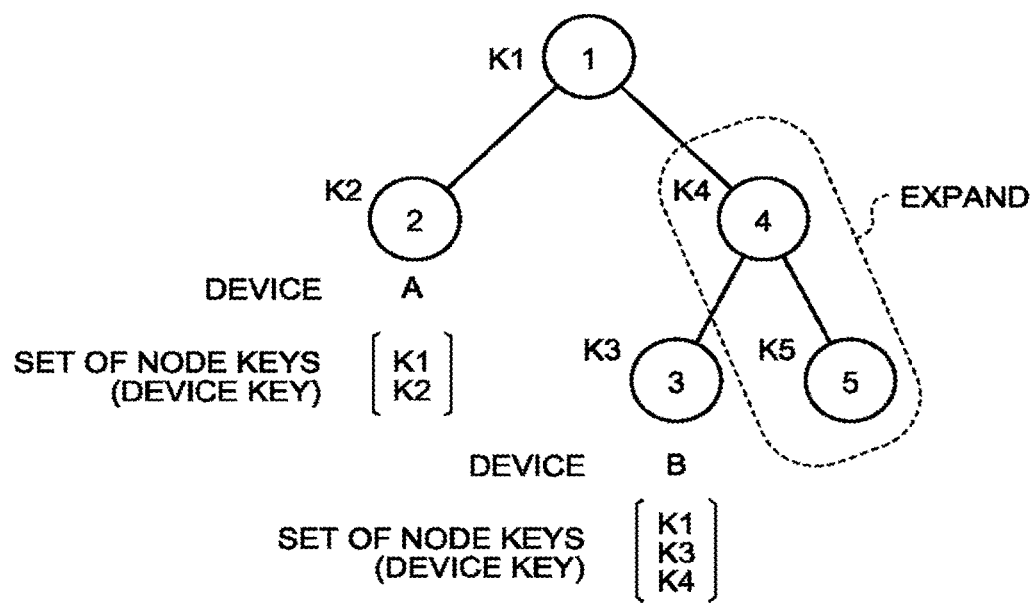
FIG. 20 is a diagram illustrating an example of expansion on a level between one of leaf nodes and a root node.

FIG. 20 is a diagram illustrating an example in which a new node is added to the level between the root node and one of the leaf nodes in the management tree information in FIG. 16. The expander 52 may add an additional new node, for example, to the level between the root node and one leaf node in the management tree information.

In the example in FIG. 20, the expander 52 adds, for example, a new node of node number 4 between the root node of node number 1 and the leaf node of node number 3. The expander 52 then adds a new leaf node of node number 5 to a level lower than the node of node number 4. The expander 52 thus forms one new empty leaf node in the management tree information to enable assignment of a new device 30.

Subsequently, the assignment transmitter 49 transmits the node key assigned to the added node of node number 4 to the second device 30-E already assigned in the management tree information. In the example in FIG. 20, the assignment transmitter 49 encrypts a new node key K4 with the node key K3 assigned to the existing node of node number 3, as represented by the formula below, and transmits the encrypted new node key to the second device 30-B. The second device 30-B thus can hold a set (device key) of three node keys K1, K3, and K4.

$$C14 = E(K3, K4)$$

In this way, an additional new node is added to the level between the root node and the leaf node in the management tree information, so that the assignment transmitter 49 can encrypt the node key assigned to the added new node with the node key assigned to the existing node and transmit the encrypted node key. The assignment transmitter 49 thus can reduce the volume of transmitted information.

Reconstruction of Management Tree Information

A method of reconstructing management tree information and a method of transmitting a node key after reconstruction will now be described. The reconstructor 53 changes the assignment position of a device 30 to a leaf node in management tree information so as to be arranged in a concentrated manner in a range of nodes in which devices 30 with high similarity are close to each other.

The reconstructor 53 executes reconstruction, for example, periodically or when a predetermined event occurs. The reconstructor 53 may reconstruct management tree information, for example, after the management tree information is expanded by the expander 52. Alternatively, the reconstructor 53 may reconstruct management tree information, for example, when no empty leaf node exists within the n-th degree from the leaf node of the device 30 having attribute information with highest similarity to a new device 30 in the management tree information. Alternatively, the reconstructor 53 may reconstruct management tree information, for example, even when an empty leaf node exists within the n-th degree from the leaf node of the device 30 having attribute information with highest similarity to a new device 30 in the management tree information.

In the example described below, the management tree information is reconstructed using time-dependent element information included in the attribute information, as an index of similarity.

Figure 21:
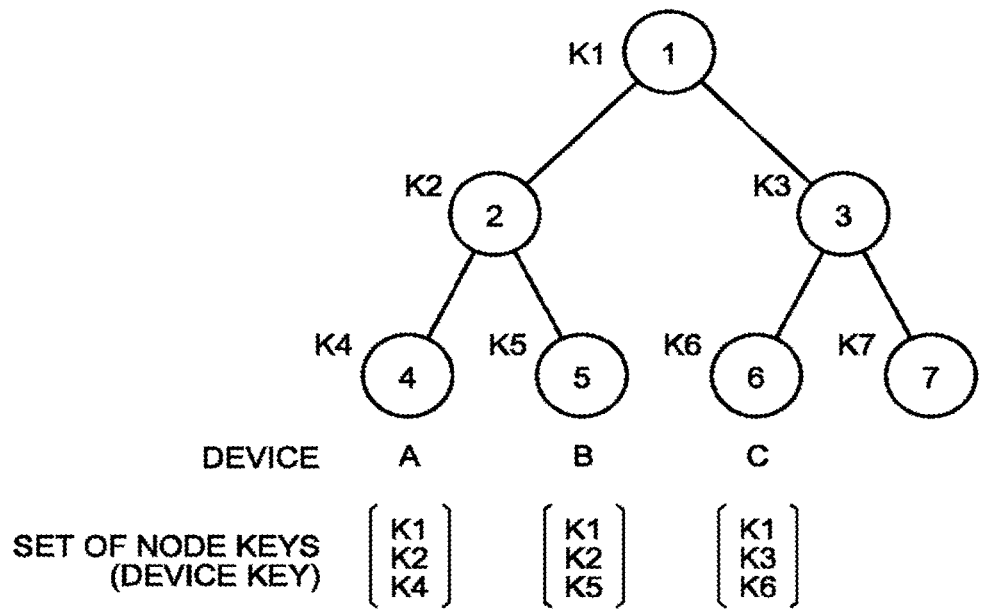
FIG. 21 is a diagram illustrating management tree information before reconstruction.

FIG. 21 is a diagram illustrating management tree information before reconstruction. In the example in FIG. 21, it is assumed that the management tree information before reconstruction is a structure of two-level perfect binary tree, in which a first device 30-A is assigned to a leaf node of node number 4, a second device 30-B is assigned to a leaf node of node number 5, and a third device 30-C is assigned to a leaf node of node number 6. In the example in FIG. 21, the first device 30-A holds a set (device key) of three node keys K1, K2, and K4. The second device 30-B holds a set (device key) of three node keys K1, K2, and K5. The third device 30-C holds a set (device key) of three node keys K1, K3, and K6.

The attribute acquiring unit 46 acquires attribute information from each device 30. It is assumed that the average power consumption of the first device 30-A is 1000 [W], the average power consumption of the second device 30-B is 100 [W], and the average power consumption of the third device 30-C is 1200 [W]. In this case, the first device 30-A and the third device 30-C are likely to simultaneously receive, for example, a control command to suppress power consumption, because the difference in average power consumption is small and the similarity is high.

When the first device 30-A and the third device 30-C are to execute a control command, first of all, the management apparatus 20 generates and transmits cyphertexts represented by the formulae below. The first device 30-A and the third device 30-C thus can hold a group key GK. The second device 30-B does not hold the node key K4 or K6 and therefore is unable to acquire the group key GK.

$$C15 = E(K4, GK)$$

$$C16 = E(K6, GK)$$

Subsequently, the management apparatus encrypts a control command CMD with the group key GK as represented by the formula below and multicasts the encrypted command to the first device 30-A and the third device 30-C.

$$C17 = F(GK, CMD)$$

The first device 30-A and the third device 30-C decrypt the received cyphertext with the group key GK to execute the control command CMD. In this way, when the management tree information is constructed as illustrated in FIG. 21, the management apparatus 20 has to generate three cyphertexts in order to transmit a control command to the first device 30-A and the third device 30-C.

Figure 22:
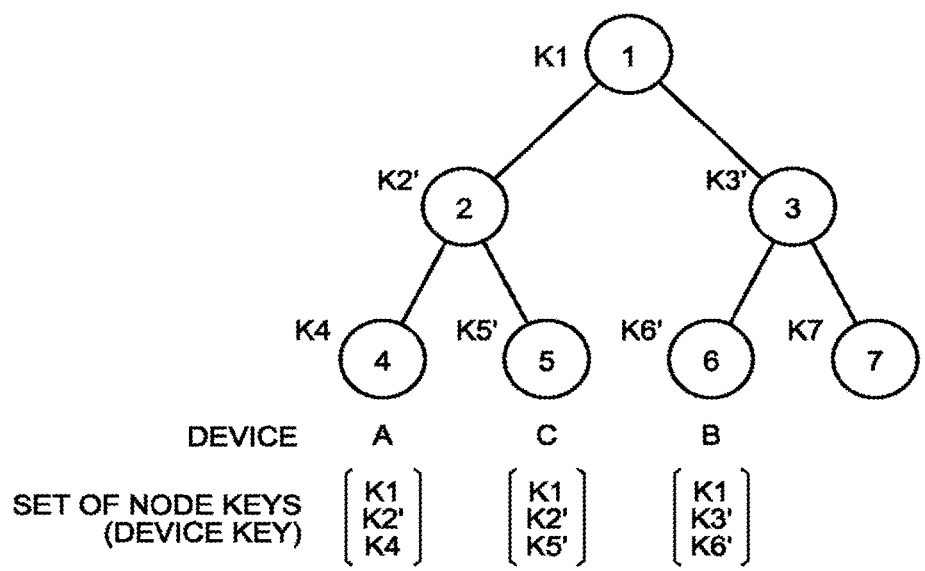
FIG. 22 is a diagram illustrating management tree information after reconstruction.

FIG. 22 is a diagram illustrating the management tree information after reconstruction. The reconstructor 53 reconstructs the management tree information, for example, such that devices 30 in which the average power consumption of the attribute information is a certain value or higher are arranged nearby. For example, the reconstructor 53 reconstructs the management tree information such that devices 30 with the average power consumption of 1000 [W] or higher are arranged within the second degree. Accordingly, the reconstructor 53, for example, assigns the first device 30-A to the leaf node of node number 4, assigns the third device 30-C to the leaf node of node number 5, and assigns the second device 30-B to the leaf node of node number 6, as illustrated in FIG. 22.

In addition, the reconstructor 53 changes the node key to be assigned to each node, in accordance with the reassignment of the devices 30. In this case, the reconstructor 53 changes the node key held by the reassigned device 30 and does not have to change the node key not held by the reassigned device 30. The reconstructor 53 does not have to change the node key held in common by all of the reassigned devices 30, either. In the example in FIG. 22, the reconstructor 53 changes the node keys of the node of node number 2, the node of node number 3, the node of node number 5, and the node of node number 6.

The assignment transmitter 49 then transmits the changed node key to the device 30. In the example in FIG. 22, the assignment transmitter 49 encrypts the node key K2' with the node key K4, as represented by the formula below, and transmits the encrypted node key to the first device 30-A. The first device 30-A thus can hold a set (device key) of three node keys K1, K2', and K4.

$$C18 = F(K4, K2')$$

The assignment transmitter 49 also encrypts the node keys K2' and K5' with the node key K6, as represented by the formulae below, and transmits the encrypted node keys to the third device 30-C. The third device 30-C thus can hold a set (device key) of three node keys K1, K2', and K5'.

$$C19 = B(K6, K2')$$

$$C20 = E(K6, K5')$$

The assignment transmitter 49 also encrypts the node keys K3' and K6' with the node key K5, as represented by the formulae below, and transmits the encrypted node keys to the second device 30-B. The second device 30-B thus can hold a set (device key) of three node keys K1, K3', and K6'.

$$C21 = E(K5, K3')$$

$$C22 = E(K5, K6')$$

Subsequently, when the first device 30-A and the third device 30-C are to execute a control command, first of all, the management apparatus 20 generates a cyphertext represented by the formula below and multicasts the generated cyphertext to the first device 30-A and the third device 30-C. The first device 30-A and the third device 30-C thus can hold the group key GK.

$$C21 = E(K2', GK)$$

Subsequently, the management apparatus 20 encrypts the control command CMD with the group key GK, as represented by the formula below, and multicasts the encrypted command to the first device 30-A and the third device 30-C.

$$C22 = B(GK, CMD)$$

That is, when the management tree information is reconstructed as illustrated in FIG. 22, the management apparatus 20 only has to transmit two cyphertexts in order to allow the first device 30-A and the third device 30-C to execute a control command. Accordingly, the management apparatus 20 can reduce the number of cyphertexts that must be transmitted, by one, to allow the first device 30-A and the third device 30-C to execute a control command.

The management apparatus 20 may encrypt the control command CMD with the node key K2' and multicast the encrypted command, without sharing the group key GK between the first device 30-A and the third device 30-C. In this case, the management apparatus 20 can transmit a control command to the first device 30-A and the third device 30-C with one cyphertext.

As described above, the management tree information is reconstructed such that devices 30 to which a control command is likely to be multicast are placed within a subtree constructed by a few nodes, so that the management apparatus 20 can reduce the number of cyphertexts to transmit and can reduce the volume of information in transmission.

The reconstructor 53 uses the average power consumption as an index of similarity when reconstructing the management tree information. Alternatively, element information of attribute information not changing with time may be used as an index of similarity. Alternatively, the reconstructor 53 may use a value obtained by synthesizing different kinds of element information, as an index of similarity. The reconstructor 53 may use the synthesized similarity by giving weights different for each piece of element information, as an index.

As described above, the management apparatus 20 according to the present embodiment reconstructs the management tree information such that devices 30 to which a control command is likely to be multicast are placed within a subtree constructed by a few nodes. The management apparatus 20 thus can reduce the volume of communication for sharing a group key or a node key for use in encryption or authentication. In addition, the management apparatus 20 can expand management tree information depending on an increase of devices 30. Accordingly, when there are a small number of devices 30, the management apparatus 20 can make management tree information small and can reduce the memory capacity and the like.

Figure 23:
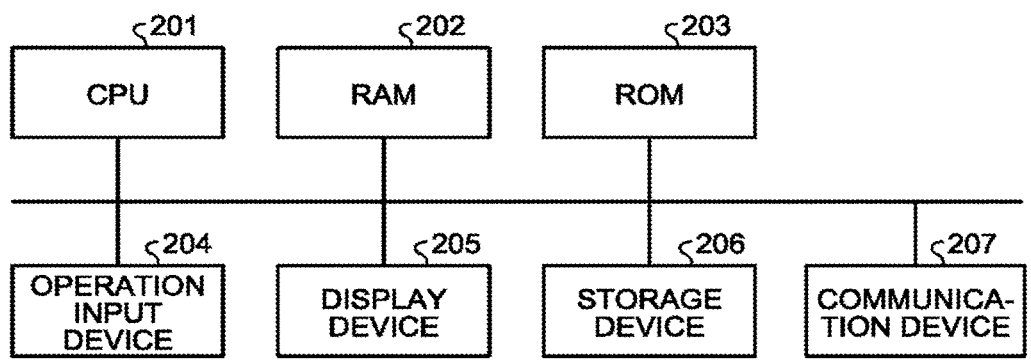
FIG. 23 is a diagram illustrating a hardware configuration of the management apparatus.

FIG. 23 is a diagram illustrating an example of the hardware configuration of the management apparatus 20 according to an embodiment. The management apparatus 20 according to the present embodiment is implemented, for example, by an information processing apparatus having the hardware configuration as illustrated in FIG. 23. The device 30 is also implemented by an information processing apparatus having a hardware configuration similar to the management apparatus 20.

This information processing apparatus includes a central processing unit (CPU) 201, a random access memory (RAM) 202, a read only memory (ROM) 203, an operation input device 204, a display device 205, a storage device 206, and a communication device 207. These components are connected through a bus.

The CPU 201 is a processor for executing operation processing and control processing under instructions of a computer program. The CPU 201 uses a predetermined area in the RAM 202 as a working area and cooperates with a computer program stored, for example, in the ROM 203 and the storage device 206 to execute a variety of processing.

The RAM 202 is a memory such as a synchronous dynamic random access memory (SDRAM). The RAM 202 functions as a working area for the CPU 201. The ROM 203 is a nonwritable memory for storing computer programs and various kinds of information.

The operation input device 204 is an input device such as a mouse and a keyboard. The operation input device 204 accepts information input by the user as an instruction signal and outputs the instruction signal to the CPU 201.

The display device 205 is a display device such as a liquid crystal display (LCD). The display device 205 displays various kinds of information based on a display signal from the CPU 201.

The storage device 206 is a device that writes and reads data into/from a semiconductor storage medium such as a flash memory or a magnetically or optically recordable storage medium. The storage device 206 writes and reads data into/from a storage medium under the control of the CPU 201. The communication device 207 communicates with an external device through a network under the control of the CPU 201.

The computer program executed in the management apparatus 20 of the present embodiment has a module configuration including a device finding module, a device authentication module, an attribute acquisition module, a similarity calculation module, an assignment module, an assignment transmission module, a group key transmission module, a generation module, an expansion module, a reconstruction module, an encryption module, and a first communication module. This computer program is loaded by the CPU 201 (processor) into the RAM 202 and executed to allow the information processing apparatus to function as the device finder 44, the device authenticator 45, the attribute acquiring unit 46, the similarity calculator 47, the assigner 48, the assignment transmitter 49, the group key transmitter 50, the generator 51, the expander 52, the reconstructor 53, the encryptor 54, and the first communication unit 55.

The management apparatus 20 is not limited to such a configuration and may be configured such that at least some of the device finder 44, the device authenticator 45, the attribute acquiring unit 46, the similarity calculator 47, the assigner 48, the assignment transmitter 49, the group key transmitter 50, the generator 51, the expander 52, the reconstructor 53, the encryptor 54, and the first communication unit 55 are implemented by hardware circuitry (for example, semiconductor integrated circuit).

The computer program executed in the device 30 of the present embodiment has a module configuration including an attribute measuring module, a management apparatus finding module, a request module, a management apparatus authentication module, an attribute transmission module, an assignment reception module, a group key reception module, a decryption module, and a second communication module. This computer program is loaded by the CPU 201 (processor) into the RAM 202 and executed to allow the information processing apparatus to function as the attribute measuring unit 63, the management apparatus finder 64, the requester 65, the management apparatus authenticator 66, the attribute transmitter 67, the assignment receiver 68, the group key receiver 69, the decryptor 70, and the second communication unit 71.

The device 30 is not limited to such a configuration and may be configured such that at least some of the attribute measuring unit 65, the management apparatus finder 64, the requestor 65, the management apparatus authenticator 66, the attribute transmitter 67, the assignment receiver 68, the group key receiver 69, the decryptor 70, and the second communication unit 71 are implemented by hardware circuitry (for example, semiconductor integrated circuit).

The computer program executed in the management apparatus 20 of the present embodiment is recorded in a computer-readable recording medium such as a CD-ROM, a flexible disk, a CD-R, and a digital versatile disc (DVD) in a computer installable or executable file format.

The computer program executed in the management apparatus 20 of the present embodiment may be stored on a computer connected to a network such as the Internet and may be downloaded via a network. Alternatively, the computer program executed in the management apparatus 20 of the present embodiment may be provided or distributed via a network such as the Internet. The computer program executed in the management apparatus 20 may be built in a ROM or the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management apparatus connectable to a plurality of devices through a network, the management apparatus comprising:
    storage configured to store therein management tree information in which node keys are respectively assigned to nodes and devices are respectively assigned to leaf nodes;
    one or more hardware processors; and
    a hardware assignment transmitter, wherein
    the hardware processors are configured to:
        calculate similarity between attribute information representing an attribute of a new device and attribute information of devices already assigned in the management tree information; and
        determine a first leaf node to which the new device is to be assigned in the management tree information, based on the similarity, and
    the hardware assignment transmitter is configured to transmit, to the new device, at least one node key of node keys assigned to nodes on a path from a root node to the first leaf node in the management tree information, wherein
    the similarity is determined based upon at least one of element information included in the attribute information of the new device and element information included in the attribute information of one of the devices already assigned being the same, a difference in value between the element information being within a certain range, and the difference being outside of the certain range.

2. The apparatus according to claim 1, wherein the hardware processors determine, as the first leaf node, an empty leaf node reachable via a predetermined number of edges from a leaf node assigned a device with the similarity equal to or greater than a reference value.

3. The apparatus according to claim 1, wherein
    the hardware processors are further configured to:
        when the management tree information does not exist in the storage, generate new management tree information and store the generated new management tree information into the storage, and
        determine any leaf node in the new management tree information, as the first leaf node.

4. The apparatus according to claim 1, wherein
    the hardware processors are further configured to expand the management tree information when the number of empty leaf nodes in the management tree information is smaller than a predetermined number, and
    the hardware assignment transmitter transmits, of node keys assigned to nodes on a path from a root node to a corresponding leaf node in the management tree information, a new node key assigned to an expanded node to a device already assigned in the management tree information.

5. The apparatus according to claim 4, wherein the hardware assignment transmitter encrypts the new node key assigned to the expanded node, using a node key that has been assigned to an existing node and is not held by another device, and transmits the encrypted new node key to the device already assigned in the management tree information.

6. The apparatus according to claim 4, wherein the hardware processors further add a node to a level higher than an existing root node in the management tree information.

7. The apparatus according to claim 4, wherein the hardware processors further add a node to a level lower than an existing leaf node in the management tree information and reassign a device that has been assigned to the existing leaf node below which the node is added, to the newly added leaf node.

8. The apparatus according to claim 1, wherein
the hardware processors are further configured to change an assignment position of a device to a leaf node in the management tree information stored in the storage, such that devices having the attribute information with the similarity equal to or greater than a predetermined value belong to a range reachable via a predetermined number of edges.

9. The apparatus according to claim 1, wherein
the attribute information includes a plurality of pieces of element information representing attributes of each device, and
when the similarity between the attribute information of the new device and the attribute information of the already-assigned device is calculated, the hardware processors make comparison with respect to each corresponding element information and synthesize comparison results with respect to the pieces of element information to calculate the similarity.

10. The apparatus according to claim 9, wherein the hardware processors synthesize the comparison results by giving weights that are different for each piece of element information to calculate the similarity.

11. The apparatus according to claim 9, wherein the attribute information includes the element information not changing with time and the element information changing with time.

12. A management apparatus connectable to a plurality of devices through a network, the management apparatus comprising:
one or more hardware processors configured to:
receive first attribute information representing attribute information of a first device, and
transmit at least one node key of node keys assigned to nodes on a path from a root node to a second leaf node in a tree structure graph constructed by assigning the first device to the second leaf node closest to a first leaf node,
the first leaf node being a node to which a second device is assigned, and
the second device being a device for which second attribute information that is attribute information of the second device coincides with the first attribute information.

13. The apparatus according to claim 12, wherein the hardware processors are further configured to transmit at least one node key of node keys assigned to nodes on a path from the root node to the first leaf node in the tree structure graph.

14. The apparatus according to claim 12, wherein
the tree structure graph is configured such that, of the devices, a device whose attribute information coincides with the received attribute information is assigned to a first leaf node, and of the devices, a device whose attribute information does not coincide with the received attribute information is assigned to a second leaf node.

15. The apparatus according to claim 12, wherein
the hardware processors are configured to receive identification information of the first device and transmit at least one node key of node keys assigned to nodes on a path from a root node to a leaf node in a tree structure graph constructed based on identification information of the first device and identification information of one or more second devices.

16. A method performed in a management apparatus connectable to a plurality of devices through a network, the management apparatus including storage configured to store management tree information in which node keys are respectively assigned to nodes and devices are respectively assigned to leaf nodes, the method comprising:
calculating similarity between attribute information representing an attribute of a new device and attribute information of devices already assigned in the management tree information,
determining a first leaf node to which the new device is to be assigned in the management tree information, based on the similarity, and
transmitting, to the new device, at least one node key of node keys assigned to nodes on a path from a root node to the first leaf node in the management tree information, wherein
the similarity is determined based upon at least one of element information included in the attribute information of the new device and element information included in the attribute information of one of the devices already assigned being the same, a difference in value between the element information being within a certain range, and the difference being outside of the certain range.

* * * * *